United States Patent
Gonzalez et al.

(10) Patent No.: US 9,983,976 B1
(45) Date of Patent: May 29, 2018

(54) FALSIFICATION OF SOFTWARE PROGRAM WITH DATASTORE(S)

(71) Applicant: TOYOTA JIDOSHA KABUSHIKI KAISHA, Toyota-shi, Aichi-ken (JP)

(72) Inventors: Nikos Arechiga Gonzalez, San Mateo, CA (US); Sumanth Dathathri, Pasadena, CA (US); Shashank Jivan Vernekar, Los Angeles, CA (US)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/364,227

(22) Filed: Nov. 29, 2016

Related U.S. Application Data

(63) Continuation-in-part of application No. 15/364,093, filed on Nov. 29, 2016, now Pat. No. 9,842,041.

(51) Int. Cl.
   *G06F 11/36* (2006.01)
   *G06F 9/44* (2018.01)
   *G06F 17/30* (2006.01)

(52) U.S. Cl.
   CPC .... *G06F 11/3604* (2013.01); *G06F 17/30294* (2013.01); *G06F 17/30371* (2013.01); *G06F 17/30589* (2013.01); *G06F 17/30952* (2013.01)

(58) Field of Classification Search
   CPC ............. G06F 17/5036; G06F 17/5077; G06F 17/505; G06F 11/3616; G06F 8/71; G06F 8/30; G06F 8/34; G06F 8/70; G06F 17/30294; G06F 17/30371; G06F 17/30589; G06F 11/3692; G06F 11/3612; G06F 11/3684; G06F 11/3604; Y02T 10/82; H04L 63/20
   See application file for complete search history.

(56) References Cited

U.S. PATENT DOCUMENTS

| | | | | |
|---|---|---|---|---|
| 8,645,761 | B2* | 2/2014 | Barman | G06F 11/3604 714/38.1 |
| 8,782,609 | B2* | 7/2014 | Robinson | G06F 11/3692 717/127 |
| 8,997,063 | B2 | 3/2015 | Krajec et al. | |
| 9,256,512 | B1* | 2/2016 | Shiraishi | G06F 11/3604 |
| 9,355,017 | B2* | 5/2016 | Neumeyer | G06F 11/368 |

(Continued)

OTHER PUBLICATIONS

Muzahid et al., AtomTracker: A Comprehensive Approach to Atomic Region Inference and Violation Detection, Dec. 2010, 11 pages.*

(Continued)

*Primary Examiner* — Thuy Dao
(74) *Attorney, Agent, or Firm* — Patent Law Works LLP

(57) ABSTRACT

The technology can advantageously improve the speed of software verification using an approximation of a datastore storing a multiplicity of indexed data. An example method may determine data point(s), suspected to violate a specification of a software program being verified, using approximation(s) of datastore(s) of the software program. Data ranges reflecting subset(s) of data from the approximation(s) that contain the data points may be determined and data entries stored in the datastore(s) may be searched for the data point(s) suspected to violate the specification. The data entries lie within the data range(s) and the method determines whether the data point(s) are in violation of the specification based on the searching.

19 Claims, 16 Drawing Sheets

(56) References Cited

U.S. PATENT DOCUMENTS

| | | | |
|---|---|---|---|
| 9,535,823 B2* | 1/2017 | Peretz | G06F 11/3684 |
| 9,720,799 B1* | 8/2017 | Lachwani | G06F 11/3604 |
| 9,870,311 B2* | 1/2018 | Clark | G06F 11/3664 |
| 2006/0123389 A1* | 6/2006 | Kolawa | G06F 11/3616 717/101 |
| 2009/0070734 A1* | 3/2009 | Dixon | G06F 8/71 717/102 |
| 2012/0116688 A1 | 5/2012 | Mishra et al. | |
| 2012/0130925 A1 | 5/2012 | Risvik et al. | |
| 2013/0345926 A1* | 12/2013 | Boulton | G01M 17/007 701/32.8 |
| 2014/0123110 A1* | 5/2014 | Wan | G06F 11/3672 717/124 |
| 2014/0189653 A1 | 7/2014 | Larson et al. | |
| 2014/0258988 A1 | 9/2014 | Neogi | |
| 2014/0375804 A1 | 12/2014 | Bulan et al. | |
| 2015/0089489 A1* | 3/2015 | Sarkar | G06F 8/67 717/173 |
| 2015/0106793 A1* | 4/2015 | Kahne | G06F 11/3648 717/130 |
| 2015/0286820 A1* | 10/2015 | Sridhara | G06F 21/566 726/23 |
| 2015/0324195 A1* | 11/2015 | Henriksen | G06F 17/30106 717/102 |
| 2015/0363192 A1 | 12/2015 | Sturtevant | |
| 2016/0171893 A1 | 6/2016 | Chen et al. | |
| 2016/0364315 A1* | 12/2016 | Lee | G06F 11/3632 |
| 2017/0061321 A1 | 3/2017 | Maiya Belur et al. | |
| 2017/0220451 A1* | 8/2017 | Mankovskii | G06F 11/3612 |

OTHER PUBLICATIONS

Chew et al., Kivati: fast detection and prevention of atomicity violations, Apr. 2010, 13 pages.*
Wikipedia, "Satisfiability modulo theories," download from https://en.wikipedia.org/wiki/Satisfiability_modulo_theories on Nov. 11, 2016 (7 pages).
Jeannin et al., "Formal Verification of ACAS X, an Industrial Airborne Collision Avoidance System," Proceedings of the 12th International Conference on Embedded Software, 2015 (10 pages).
Wikipedia, "Lookup table," download from https://en.wikipedia.org/wiki/Lookup_table on Nov. 9, 2016 (5 pages).
Wikipedia, "Piecewise," download from https://en.wikipedia.org/wiki/Piecewise on Nov. 9, 2016 (2 pages).
Dathathri et al., "Learning-Based Abstractions for Nonlinear Constraint Solving," Proceedings of the Twenty-Sixth International Joint Conference on Artificial Intelligence, Aug. 25, 2017 (8 pages).

* cited by examiner

700 → 
```
if (f₁(a,x)>0)
    y=g₁(a,x)
elseif (f₁(a,x)>0)
    y=g₂(a,x)
    ⋮
elseif (fₙ(a,x)>0)
    y=gₙ(a,x)
end
```

702 →
$y = g_1(a,x) \cdot \text{sigmoid}(f_1(a,x)) +$
$g_2(a,x) \cdot \text{sigmoid}(f_2(a,x)) +$
$\ldots +$
$g_n(a,x) \cdot \text{sigmoid}(f_n(a,x)) +$

Figure 7A

704 →
```
if (f₁(a,x)>0)
    y=g₁(a,x)
elseif (f₁(a,x)>0)
    y=g₂(a,x)
    ⋮
elseif (fₙ(a,x)>0)
    y=gₙ(a,x)
end
```

706 →

$$\tilde{y}(x,a) = \sum_{i=1}^{k} f_i(x,a) \left( \prod_{k=1}^{i-1} \text{sigmoid}(g_k(x,a)) \right) \text{sigmoid}(g_i(x,a))$$

Figure 7B

| $x_1^{(1)}$ | ... | $x_i^{(1)}$ | ... | $x_n^{(1)}$ | $y^{(1)}$ |
|---|---|---|---|---|---|
| ⋮ | | ⋮ | | ⋮ | ⋮ |
| $x_1^{(j)}$ | ... | $x_i^{(j)}$ | ... | $x_n^{(j)}$ | $y^{(j)}$ |
| ⋮ | | ⋮ | | ⋮ | ⋮ |
| $x_1^{(m)}$ | ... | $x_i^{(m)}$ | ... | $x_n^{(m)}$ | $y^{(m)}$ |

FALSIFICATION OF SOFTWARE PROGRAM WITH DATASTORE(S)

CROSS-REFERENCE TO RELATED APPLICATIONS

The present application a continuation-in-part of U.S. patent application Ser. No. 15/364,093, titled "Approximation of Datastore Storing Indexed Data Entries", filed Nov. 29, 2016, the entire contents of which are incorporated herein by reference.

BACKGROUND

The present disclosure relates to software program verification.

In computing, formal verification and testing are often used for system verification, such as model-based development of automotive software, to determine that a given design is defect-free. FIG. 1A is a block diagram of an example automotive feedback control system which uses lookup tables (LUTs), which may be populated using experimental data. In this example, the controller 102 can use LUTs as control code to allow for simplified changes to control behavior in different environments. The monitor 104 can use LUTs to model physical components when components are difficult to model accurately from physical principles. This can help to attain a desired effect when checked by the monitor in block 106.

Theoretically, formal verification can addresses an infinite number of scenarios because there may be infinitely many possible inputs. As an example, FIG. 1B is a block diagram illustrating an example system 110 receiving inputs $x_1$-$x_n$, and outputting outputs $y_1$-$y_n$. In this example, the verification goal is to prove that when the inputs satisfy a certain assumption, the outputs satisfy a certain guarantee, as illustrated by the following formula:

$$\text{assume}(x_1, \ldots, x_n) \Rightarrow \text{guarantee}(y_1, \ldots, y_m).$$

However, computing the outcomes of an infinite number, or even a huge number of, possible inputs $x_n$ is not practical, which makes formal verification impractical to scale to meet the requirements of complex systems, such as automotive software. This can be particularly true for industrially deployed software, such as automotive software. In automotive software, a source of complexity is LUTs, of which automotive software in particular often makes heavy use, and which typically have numerous entries which are used for making control decisions and/or as models of physical processes. LUTs must be proven case by case. Cascaded LUTs can increase the number of proof cases exponentially.

For instance, in one case study based on a real automotive software component, there were $10^{50}$ proof cases. If each proof case could be resolved in 0.01 seconds on a cluster with one million cores, the total proof would take on the order of $10^{34}$ years to complete, which is clearly impractical in real world scenarios. On the other hand, automotive software is often complex and safety critical, so ensuring the software is bug free and that the different components of the software work safely and correctly may be essential. The scalability challenge associated with LUTs in formal verification of automotive software is often regarded as one of the most difficult unsolved problems.

As a further example, FIG. 1C depicts an example simple system model 114. In this example, ideally, when the input is between [0, 4], the output should never not be a number (NaN). Formal verification can theoretically attempt to prove mathematically that the denominator (x−3.26598) is never zero over [0, 4] by identifying that, a certain x, y is undefined. However, since there are an infinite number of inputs possible, determining this result with perfect resolution or even limited resolution is impractical, particularly in real world applications, as it would require too much time.

Thus, while formal verification provides a theoretical mathematical proof for establishing whether the system behaves correctly under all possible inputs, it is computationally expensive and impractical to scale for most scenarios that involve numerous inputs as described above.

In contrast, testing shows that the system behaves correctly in a single scenario, and may be iterated for a number of scenarios to show correct behavior. However, it is resolution constrained because it is limited to a certain set of inputs, and thus unable to verify a design is 100% error free. Thus, many tests can show correct behavior in many scenarios, but only finitely many. As a result, in practical terms, there are design bugs that are very difficult to catch with testing.

On the other hand, with testing, determining which inputs break the model is also challenging because the algorithm would have to randomly determine those unknown input values. Most tests would indicate the system works correctly based on a predetermined set of inputs and possibly promote a false sense of security. So while testing may be computationally more achievable and scalable than formal verification, it is often unable to determine that a design is error free (e.g., 100% error free, within a certain number of standard deviations, etc.).

As a result, in general, efficiently and automatically verifying software that uses LUTs is beyond the capabilities of many existing techniques. For instance, one existing approach that proposes a solution for analyzing a model (embodying an air-flight controller) that contains LUTs is described by the publication "Formal Verification of ACAS X, an Industrial Airborne Collision Avoidance System," by J. B. Jeannin, K. Ghorbal, Y. Kouskoulas, R. Gardner, A. Schmidt, E. Zawadki, A. Platzer ("Jeannin"), In EMSOFT, 2015. Jeannin's model can produce around a trillion proof cases. In light of this, Jeannin describes using an interactive theorem prover to manually simplify the model and infer sufficient conditions for elements of the lookup table to be safe, and then the elements of the lookup table are checked on a supercomputer. However, the approach proposed by Jeannin is not adequate because it is not automatic and it requires heavy intervention by a human user to decompose the proof before appropriate conditions on the LUTs can be derived. Additionally, Jeannin's approach is highly computationally expensive.

Some further solutions attempt to approximate LUTs, such as over-approximation approaches that abstract and refine an LUT using CEGAR loops. Under this approach, as shown in FIG. 2, an approximation of points is computed that yield the smallest error possible; upper and lower bounds 206 and 208 are offset to a certain degree using the approximation; and linearly interprets points 204 and verifies whether any of the points crosses the upper or lower bounds. If so, the approach selects a set of sample points, adds them to the LUTs, and repeats the procedure until the problematic areas are fit.

However, since approximations, such as 204, often have conflicting requirements (e.g., low error rate and low complexity), the CEGAR loop-based solutions are generally unable to producing accurate functions that reliably approximate an LUT, particularly since industrial LUTs frequently have sharp corners 210 that suggest a hard transition between different regimes of operation, as shown in FIG. 2. Thus, current simple approximating functions, which are generally smooth, generally fail to adequately fit a sharp corner (e.g., with a smooth function), and generally result in using complex functions having high arithmetic complexity, such as polynomials of high degree, which are difficult to analyze efficiently.

Further, existing solutions that rely on abstractions, such as CEGAR loop-based ones, typically search the entire LUTs to determine whether a given point in an abstraction is acceptable, which is also not practicable at scale for the same reasons as those mentioned above.

SUMMARY

A system of one or more computers can be configured to perform particular operations or operations by virtue of having software, firmware, hardware, or a combination of them installed on the system that in operation causes or cause the system to perform the operations. One or more computer programs can be configured to perform particular operations or operations by virtue of including instructions that, when executed by data processing apparatus, cause the apparatus to perform the operations.

One general aspect includes a computer-implemented method for verifying one or more errors identified using an approximation, including: determining, using one or more computer processors, one or more data points, suspected to violate a specification of a software program being verified, using an approximation of a datastore of the software program; determining, using the one or more computer processors, one or more data ranges reflecting one or more subsets of data from the approximation that contain the one or more data points; searching, using the one or more computer processors, data entries stored in the datastore of the software program for the one or more data points suspected to violate the specification of the software program, the data entries lying within the one or more data ranges; and determining, using the one or more computer processors, whether the one or more data points are in violation of the specification based on the searching.

Other embodiments of this aspect include corresponding computer systems, apparatus, and computer programs recorded on one or more computer storage devices, each configured to perform the operations of the methods.

Implementations may include one or more of the following features. The computer-implemented method where the datastore includes a lookup table associated with the software program. The computer-implemented method where the software program is an automotive software program. The computer-implemented method where the data entries of the datastore model a physical system controlled by the software program. The computer-implemented method where the approximation includes a lower bounding region and an upper bounding region, the lower bounding region and the upper bounding region meet along a centerline including data points having values retrieved from data entries of the datastore, and each of the one or more data points, suspected to violate the specification, lie within one of the lower bounding region and the upper bounding region. The computer-implemented method where determining whether the one or more data points are in violation of the specification based on the searching includes: extracting data entries from the datastore that lie within each of the one or more data ranges, and determining whether the one or more data points match one of the data entries lying within one of the data ranges. The computer-implemented method where determining whether the one or more data points are in violation of the specification based on the searching includes: confirming that a data point from the one or more data points is an error because the data point matches a data entry from among the extracted data entries. The computer-implemented method where determining whether the one or more data points are in violation of the specification based on the searching includes: confirming that a data point from the one or more data points is not an error because the data point does not match a data entry from among the extracted data entries. The computer-implemented method where the multiplicity of indexed data entries includes $10^{10}$ or more entries.

One general aspect includes a computer system that includes determining, using one or more computer processors, one or more data points, suspected to violate a specification of a software program being verified, using an approximation of a datastore of the software program. The computer system also includes determining, using the one or more computer processors, one or more data ranges reflecting one or more subsets of data from the approximation that contain the one or more data points. The computer system also includes searching, using the one or more computer processors, data entries stored in the datastore of the software program for the one or more data points suspected to violate the specification of the software program, the data entries lying within the one or more data ranges. The computer system also includes determining, using the one or more computer processors, whether the one or more data points are in violation of the specification based on the searching. Other embodiments of this aspect include corresponding computer systems, apparatus, and computer programs recorded on one or more computer storage devices, each configured to perform the operations of the methods.

Implementations may include one or more of the following features. The computer system where the datastore includes a lookup table associated with the software program. The computer system where the software program is an automotive software program. The computer system where the data entries of the datastore model a physical system controlled by the software program. The computer system where the approximation includes a lower bounding region and an upper bounding region, the lower bounding region and the upper bounding region meet along a centerline including data points having values retrieved from data entries of the datastore, and each of the one or more data points, suspected to violate the specification, lie within one of the lower bounding region and the upper bounding region. The computer system where determining whether the one or more data points are in violation of the specification based on the searching includes: extracting data entries from the datastore that lie within each of the one or more data ranges, and determining whether the one or more data points match one of the data entries lying within one of the data ranges. The computer system where determining whether the one or more data points are in violation of the specification based on the searching includes: confirming that a data point from the one or more data points is an error because the data point matches a data entry from among the extracted data entries. The computer system where determining whether the one or more data points are in violation of the specification based on the searching includes: confirming that a data point from the one or more data points is not an error because the data point does not match a data entry from among the extracted data entries. The computer system where the multiplicity of indexed data entries includes $10^{10}$ or more entries. Implementations of the described techniques may include hardware, a method or process, or computer software on a computer-accessible medium.

BRIEF DESCRIPTION OF DRAWINGS

The disclosure is illustrated by way of example, and not by way of limitation in the figures of the accompanying drawings in which like reference numerals are used to refer to similar elements.

FIGS. 7A and 7B are diagrams showing example approximations.

FIG. 9 depicts an example datastore.

DETAILED DESCRIPTION

The technology described herein can advantageously compute an approximation of datastore(s) storing a multiplicity of indexed data. An example of such a datastore may include lookup table(s) (LUT(s)). The datastore(s) may store large volumes of data reflect a myriad different cases. For instance, the multiplicity of data entries may include $10^{10}$ or more entries in some cases, although other data volumes are also applicable and contemplated.

The datastore(s) may be associated with a complex system, such as an automotive control system, aircraft control system, factory control system, etc., that is impractical to model using a formula and is often modeled using experimental data. Further example systems may include the engine, transmission, autonomous driving control, safety systems, etc., of a vehicle. For instance, an engine control may be responsible for regulating ignition control, fuel injection, heating and cooling, and other functions of the engine, the parameters of which may vary widely based on ambient temperature, driving mode (e.g., sport, economical, etc.), and the datastore(s) may a set of data entries (e.g., in two or more columns) for each use case of the engine, which can vary widely. In an example, each use case may correspond to a different set of entries. For instance, the datastore(s) may include data table(s) including columns for the data input and outputs and rows for each set of entries, although it should be understood that any other dataset formats are contemplated and encompassed by this disclosure.

The multiplicity of indexed data, or portions of the indexed data, may be disjointed from other portions and difficult to model using complex equations, such as polynomial functions, as described in the Background. For example, the indexed data may include sharp corners, steps, and/or other discontinuities that may be difficult to fit.

In some embodiments, the technology works from the datastore(s) to automatically derive tight approximations of the input-output behavior of the datastore(s). An approximation generated using the technology described herein may advantageously fit piecewise functions, which in turn, can provide a fit, within an acceptable confidence, sharp corners that may occur in the data stored in the datastore(s).

The technology provides numerous advantages including a scalable, improved system capable of verifying software having and/or reliant upon datastore(s) storing such data, while avoiding exponential complexity.

Figure 1A:
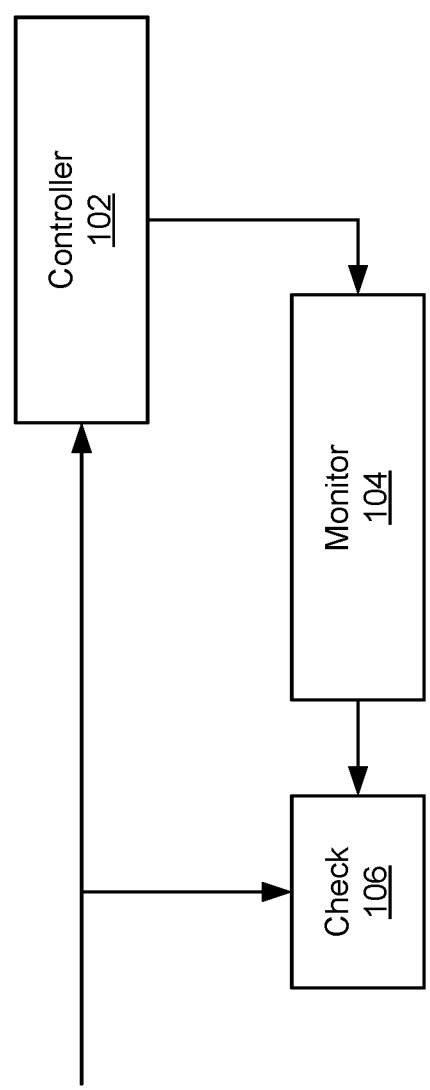
FIG. 1A is a block diagram of an example control system.
Figure 1B:
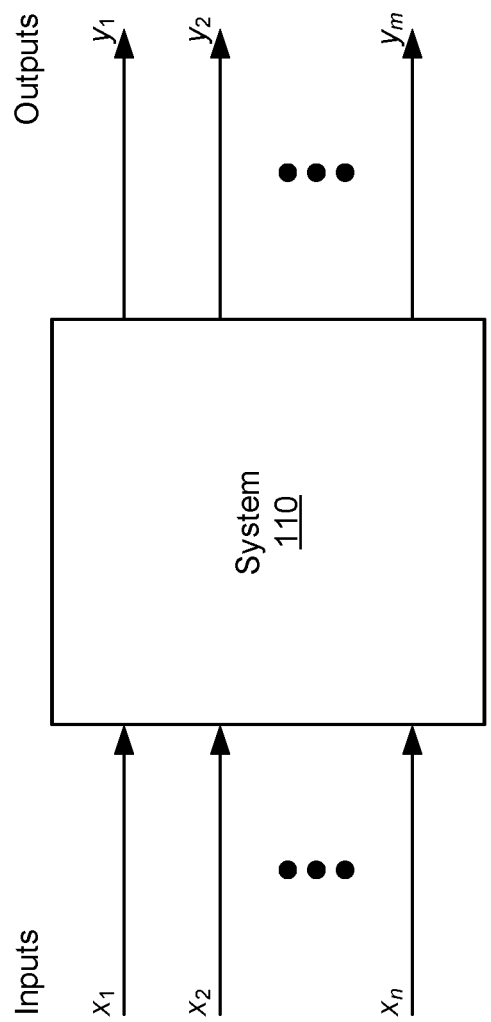
FIG. 1B is a block diagram of an example system receiving various inputs and outputting various outputs.
Figure 1C:
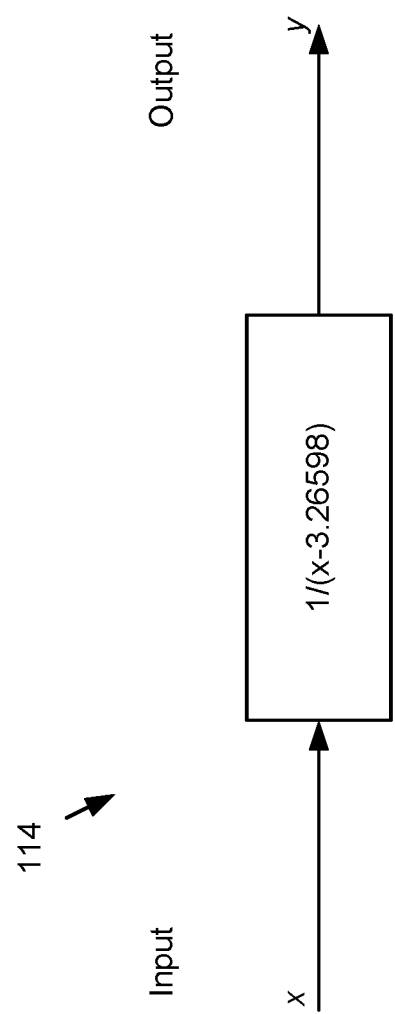
FIG. 1C is a block diagram of an example simple system model.
Figure 2:
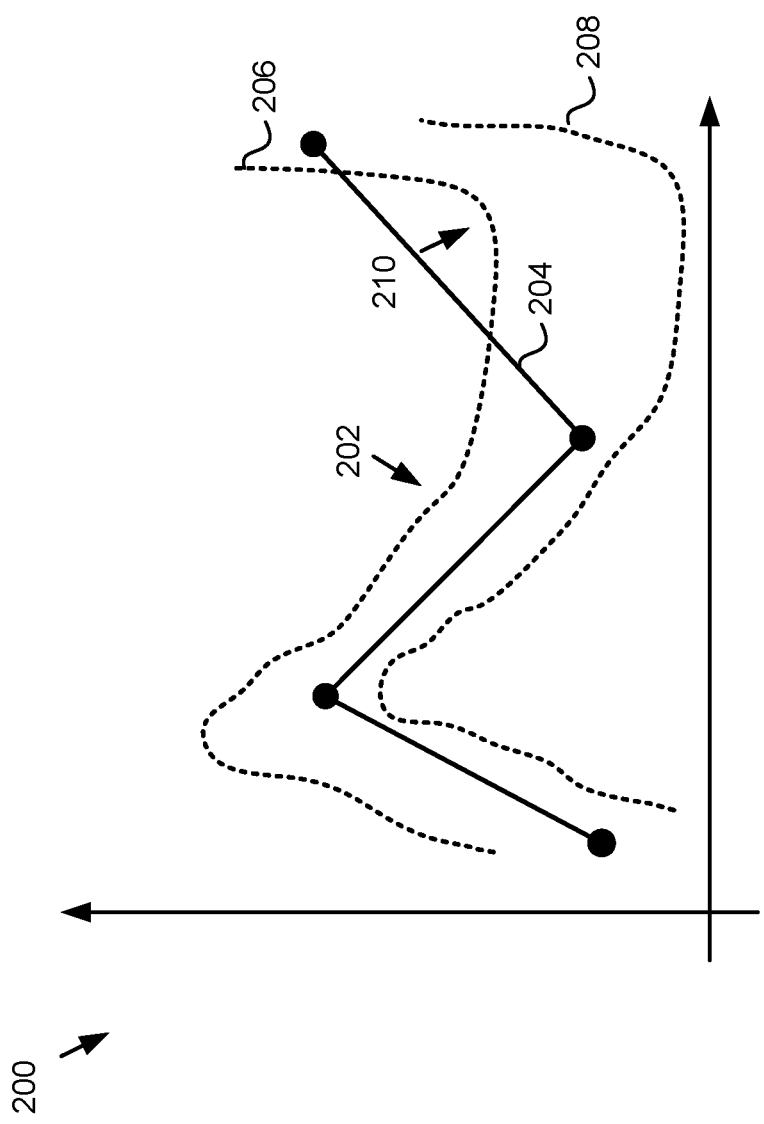
FIG. 2 is a graph indicating limitations of bounding functions determined using existing solutions.
Figure 3A:
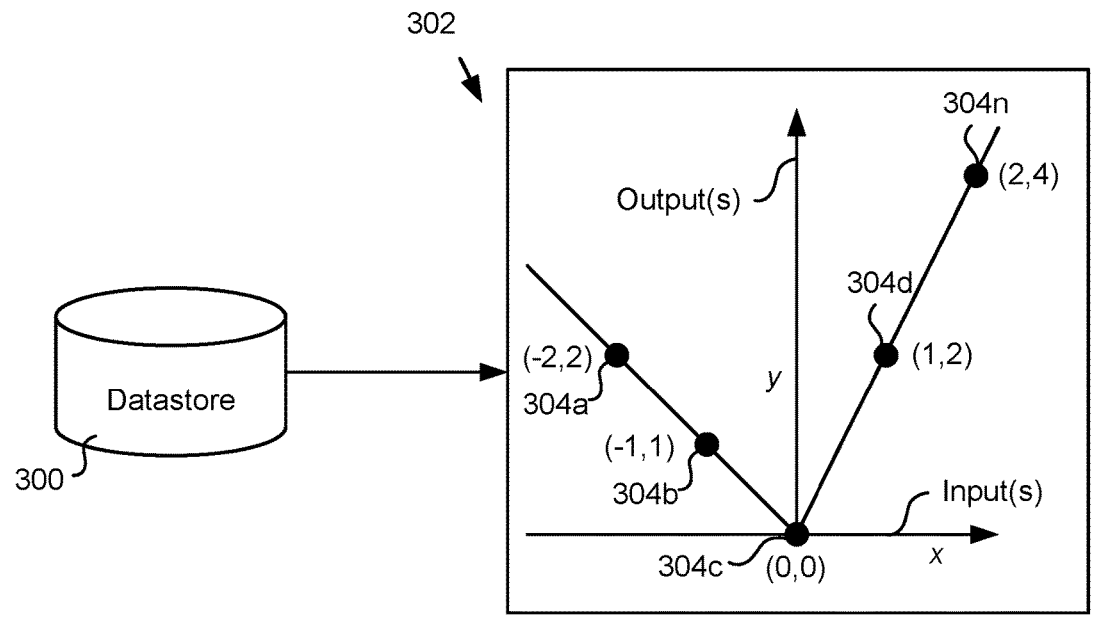
FIG. 3A is a block diagram of example input/output behavior of a datastore.
Figure 3B:
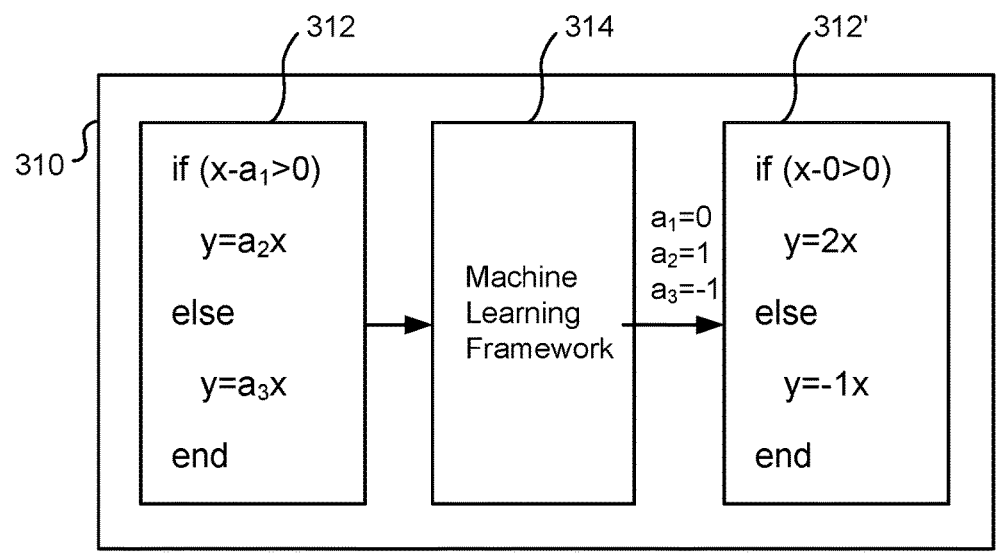
FIG. 3B is a block diagram of an example approximation generator.

FIG. 3A is a block diagram of example input/output behavior 302 of an example datastore 300, and FIG. 3B is a block diagram of an approximation generator 310 configured to generate an approximation of the datastore using a machine learning framework 314 and a program template 312. The points 304a-304n (also simply referred to as 304) are data from the datastore 300. The x values of the points 304 reflect an input value and the y values of the points 304 reflect an output value. The behavior 302, when graphed, shows the disjointed, piecewise nature of the data points 304.

The program template 312 (also simply called a template), including programming logic that, when executed, calculates output(s) based on input(s) and parameter(s). The parameter(s) (also called variables) in the template 312 (e.g., $a_1$, $a_2$, $a_3$, etc.) may be initially undetermined, and the machine learning framework 314 is configured to learn the parameter values (thus making the undetermined parameters determined). In some instances, the programming logic includes conditional statements collectively representing a piecewise function. For instance, each of the conditional statements may include a different sub-function of the piecewise function. Each of the sub-functions may include corresponding undetermined variable(s)/parameter(s) and input(s), and may be processed to generate an output.

As a further example, a piecewise template may include:

$$f(a, x) = \begin{cases} f_1(a, x) \text{ if } g_1(a, x) > 0 \\ f_2(a, x) \text{ if } g_1(a, x) \leq 0 \land g_2(a, x) > 0 \\ \vdots \\ f_k(a, x) \text{ otherwise} \end{cases}$$

To improve the ability to differentiate at the switching surfaces. Instead, the approximation generator 310 may approximate the piecewise function by a smooth function. For instance, the piecewise function can be represented as a sum of functions that are turned on or off by using a step function. Assuming $s:\mathbb{R} \to \{0, 1\}$ denotes the Heaviside step function:

$$s(x) = \begin{cases} 0 & \text{if } x \leq 0 \\ 1 & \text{otherwise} \end{cases}$$

Using the step function, the piecewise function may be represented by $$f = s(g_1) \cdot f_1 + (1 - s(g_2)) \cdot f_2 + \ldots + \left(\prod_{i=1}^{r-1}((1-s(g_i)))\right) \cdot s(g_r)f_r + \ldots + \left(\prod_{i=1}^{k-1}((1-s(g_i)))\right) \cdot s(g_k)f_k,$$

Since f may possibly be discontinuous and non-differentiable, f may be approximated with a continuous differentiable function by replacing the step function by the sigmoid function σ, which smoothly transitions from 0 to 1 as its argument crosses zero, such as:

$$\sigma(x) = \frac{1}{1 + e^{-x}} \cdot f_a(x) = \sum_{i=1}^{k} f_i(x, a) \left(\prod_{k=1}^{i-1}(1 - \sigma(-g_k(x, a)))\right) \sigma(g_i(x, a)).$$

As depicted in FIG. 3B, an example template 312 has conditional statements: if x minus $a_1$ is greater than zero, then y equals $a_2$ times x, where $a_1$ and $a_2$ are both unknown/undetermined parameters. Otherwise y equals $a_3$ times x, where $a_3$ is an undetermined parameter, etc. The undetermined parameters may be input into the machine learning framework 314, which processes the processes the inputs, learns the parameter values, and outputs the parameter values. For example, the machine learning framework may output an array including the parameter values.

The machine learning framework 314 is configured to learn the undetermined parameters. As an example, consider a function f(a,x) that depends on a vector of inputs x but also on an unknown vector of parameters a. The parameters are unknown values that must be learned so the function from the template can be used.

In some instances, the machine learning framework 314 is configured to choose the parameters a so that at each k-th entry of the datastore 300 (k=1, . . . , m), $f(a,x_k)$ is as close as possible to the output of the lookup table, $y_k$. Various different approaches may be used by the machine learning framework 314 to solve for these parameter values, such as the following non-limiting examples:

Linear regression: Given a function template $y=a_1x_1+a_2$, the goal is to find values of the parameter vector a=(a1, a2) such that the data fits well. The input vector is $x=(x_1)$ in this example is a single dimension.

Neural networks: While not required, the function template is often significantly more complex than those used under other approaches, such as linear regression. In an example using a neural network with a single neuron and two inputs, an example function template may be $y=\text{sigmoid}(a_1x_1+a_2x_2)$, where the input vector is $x=x_2$) and the parameter vector is $a=(a_1, a_2)$.

The machine learning framework 314 may be configured to accept, and allow the approximation generator 310 to specify as input, which template(s) to use for the function f(a, x). The machine learning framework 314 may also be instructed on which learning scheme to use for training. For instance, the machine learning framework 314 may be instructed to train using linear regression, instructed to train one or more neural networks, etc. This may be accomplished by inputting suitable program template(s) including the requisite and/or specific structure for that scheme (functions suitable for neural networks, linear regression, etc.).

In some embodiments, the machine learning framework 314 is configured to use sigmoids and weights determined based on the input data (e.g., parsed data and parsed templates) to calculate the values for the parameters, as discussed below in the embodiment discussed with reference to FIG. 9, for example. While sharing similarities with a template for a standard neural network, this embodiment differs because in a neural network, the input of the sigmoid function is usually linear, whereas the example is in general a nonlinear function $g_i$. Further, in a neural network, the sigmoid is not multiplied by anything, whereas, in the embodiment, each sigmoid is multiplied by the product of previous function g's, as well as the current function $f_i$. The embodiment is advantageous because it allows approximation of programming logic, such as conditional statements (e.g., if-then-else), which a standard neural network may, in some cases, not be able to approximate reliably.

In some embodiments, the machine learning framework 314 may support any number of machine-learning schemes, including but not limited to neural-network-based schemes. A non-limiting example of the machine learning framework 314 may include Google™ Tensor Flow, although other frameworks and machine learning algorithms other than neural network-based algorithms are also contemplated and encompassed by this disclosure.

In some embodiments, once the machine learning framework 314 solves for the undetermined parameter values, the values may be incorporated into the template 312 so the functions may be solved using the programming logic from the template. For instance, the approximation generator 310 may parse the template 312 and replace the unknown parameters with the determine values to produce populated template 312', as shown in FIG. 3B, and the verifier 420 may use the populated template(s) 312' during verification.

Figure 4:
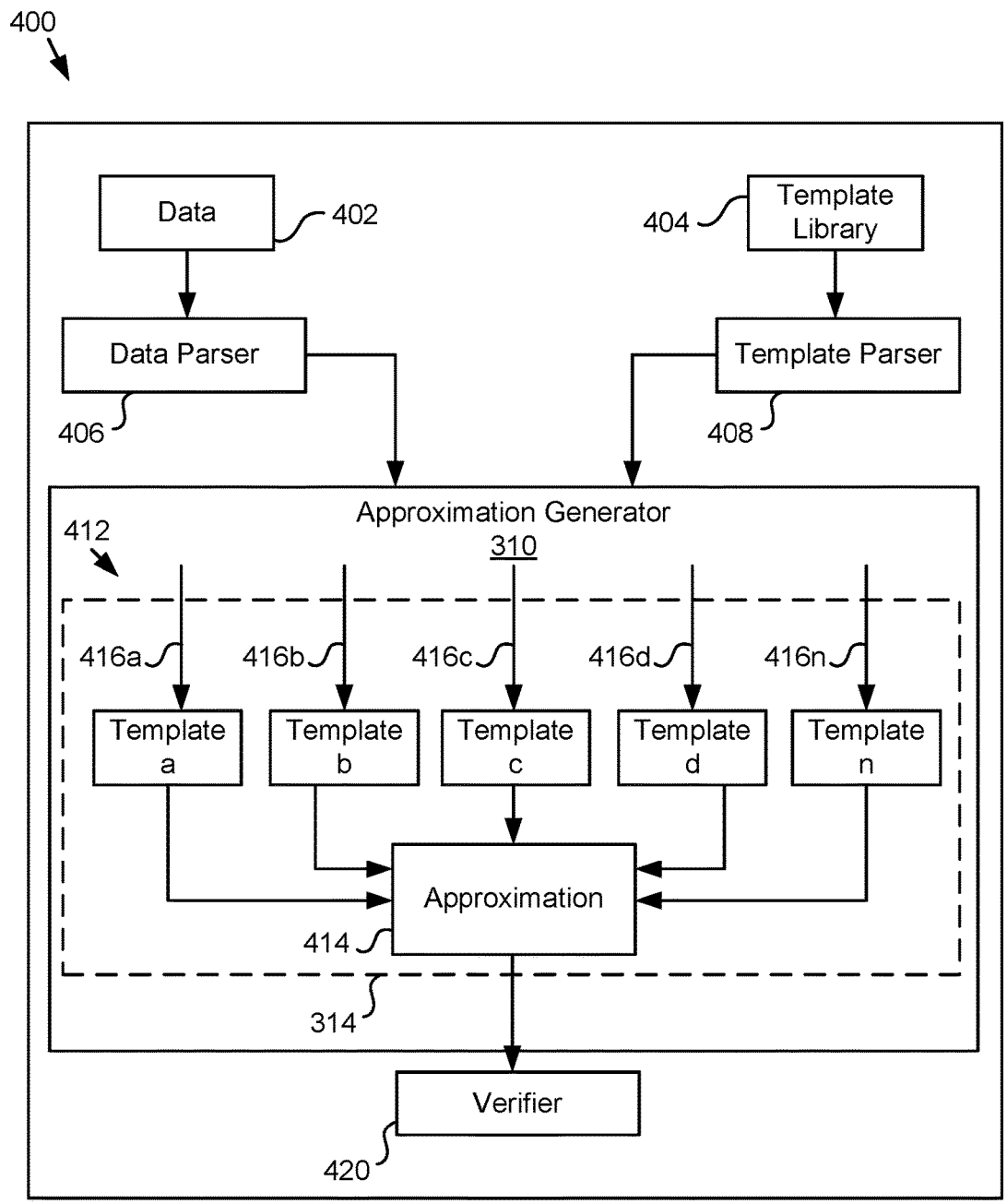
FIG. 4 is a block diagram of an example application and data flow for generating and verifying an approximation.

FIG. 4 is a block diagram of an example application 400 and data flow for generating and verifying an approximation. The application 400 includes data 402 retrieved from the datastore 300, a data parser 406 that parses the data retrieved from the datastore 300 into a format compatible with the approximation generator 310, although in further embodiments the data may be stored in a format compatible with the approximation generator 310, in which case the data parser 406 may retrieve and input data from the datastore 300 into the approximation generator 310. The application 400 further includes a template library 404, a template parser 408, and the approximation generator 310.

The data parser 406, the template parser 408, the approximation generator 310, and the machine learning framework 314, and the verifier 420 may be coupled for communication with one another, the web server 134, the e-commerce application 136, and the user application 538, and/or the datastore(s) 300 and/or data repositories to call functions and/or store, update, and/or retrieve data.

The data parser 406, the template parser 408, the approximation generator 310, the machine learning framework 314, the verifier 420, the user application 538 (see FIG. 5), the web server 554 (see FIG. 5), and/or other components may be computer-executable elements of the system 500. In some cases, these components may be referred to as the actor (in the third person) for convenience and so as not to obscure the acts, operations, and functionalities (also referred to simply as operations) carried out by them. However, it should be understood that these components may comprise software (set(s) of computer instructions, computer programs, etc.) that, when executed by one or more computing devices (e.g., including standard hardware computer processors), program the computing device(s) to perform the specific operations described herein. Further, it should be understood that these components (e.g., set(s) of computer instructions) or portions thereof could additionally and/or alternatively be implemented in hardware circuitry included in the computing device(s), such a field-programmable gate array (FPGA), an application-specific integrated circuit (ASIC), or other suitable circuitry without departing from the scope of this disclosure.

The template library 404 includes various different templates, which include programming logic for processing various functions. Example functions include linear functions, quadratic functions, sin and cosine functions, polynomial functions, etc. Further functions may include equations models of physical systems, such as but not limited to engine control models, etc. The functions include input and parameter variables as described elsewhere herein. For example, a linear function may include $f(x)=a_1x_1+a_2x_2+a_{3=0}$, where $x_1$ and $x_2$ are inputs and $a_1$, $a_2$, and $a_3$ are parameters whose values are unknown/not yet determined. In another example, a quadratic function may include $f(x)=a_1x_1^2+a_2x_2^2+a_3 x_1x_2=0$, where $x_1$ and $x_2$ are inputs and $a_1$, $a_2$, and $a_3$ are parameters whose values are unknown/not yet determined. In some cases, the template library 404 may be extended by a user to adapt the system 500 to determine an approximation for a particular/custom system being modeled by the user.

The template parser 408 parses template(s) retrieved from the template library into parsed template(s) suitable for input and/or processing by the approximation generator 310. The data 402 includes a set of data entries retrieved from the datastore 300.

The approximation generator 310 includes and/or cooperates with the machine learning framework 314, which is programmed to learn the parameters using the data from the datastore 300 and data from the parsed template(s) input into the approximation generator 310.

In some embodiments, the template library may be sorted by one or more criteria, such as by complexity. In some cases, sets of templates may be grouped according to complexity labels (e.g., simple, moderate, complex), or may be ranked accordingly using a scoring value. For instance, an example template having a lowly complex level may include a linear function (e.g., $y=a_1x+x_2$), a moderately complex level template may include a quadratic function (e.g., $y=a_1x_1^2+a_2x_1^2+a_3$) and a piecewise linear function with two cases, a highly complex level template may include cubic functions, piecewise linear functions with three cases, and a piecewise quadratic function with two cases, etc. In some cases, various complexity levels may include sine/cosine functions, standard engine control equations, etc. Other variations are also possible and contemplated as discussed elsewhere herein.

In some embodiments, a user, using an input devices of a computing device (e.g., a pointer device, touchscreen, etc.) inputs one or more indexes for one or more templates in the library. In the case where the user selects a plurality of templates, the approximation generation 310 may invoke a parallel thread 416a-416n for each parsed template a-n. The machine learning framework 314 may process each thread 416a-416n and produce a single approximation 414 or a plurality of approximation(s) 414 based on the parsed templates a-n and corresponding data from the datastore 300. Using a plurality of templates (e.g., iteratively, in parallel in batches accordingly to complexity, etc.), an optimized approximation may efficiently be determined in some cases.

The approximation generator 310 may determine the parameter value(s), and calculate, using the template(s) and the parameter value(s), approximation(s) 414 based on an error value. As a non-limiting example, the approximation generator 310 may, using templates y=f(a, x) at a lowest level of complexity, apply machine learning to find an appropriate value of "a" for each template, and compare the approximation error between the different templates. So, if $y_i$ is the $i^{th}$ output of a datastore (e.g., LUT), and there are m entries in the LUT, the approximation generator 310 may calculate the error (e.g., mean-squared-error using $(1/m)*$ $Sum((f(a,x)-y_i)^2)$. Then, the verifier 420 may use the approximation to prove that the model for the datastore is correct. If unsuccessful, the approximation generator 310 may iterate a more complex template(s) from the template library to better model the datastore. In further examples, the application 400 may utilize the falsification technique described herein and/or alternate between the iterative approached described herein (which attempts to prove correctness) and the falsification technique described herein (which attempts to prove incorrectness) until one of techniques is successful.

As discussed elsewhere herein, an approximation 414 may include the fitted programming logic from the program template(s) to which it corresponds, thus allowing the approximation 414 to fit such as sharp corners and other anomalies in the data of the datastore 300, and thereby accurately reflecting (e.g., tightly fitting) the input/output behavior of the datastore 300. The approximation 414 can be used by the verifier 420 as a proof or portion thereof during verification.

In some embodiments, the approximation 414 having lowest error value or an error value with a predetermined range is selected, as discussed elsewhere herein. In some embodiments, the approximation generator 310 may be configured to determine a vector of parameter value(s) that minimize mean-squared error over the data stored in the datastore 300, and which are used to populate the program template(s) to yield the approximation, as discussed elsewhere herein.

In some embodiments, the approximation generator 310 may determine upper and lower bounds using the approximation 414, which may be used by the verifier 420 to efficiently verify a complex system by determining whether values lie within or outside of the upper and lower bounds.

Figure 5:
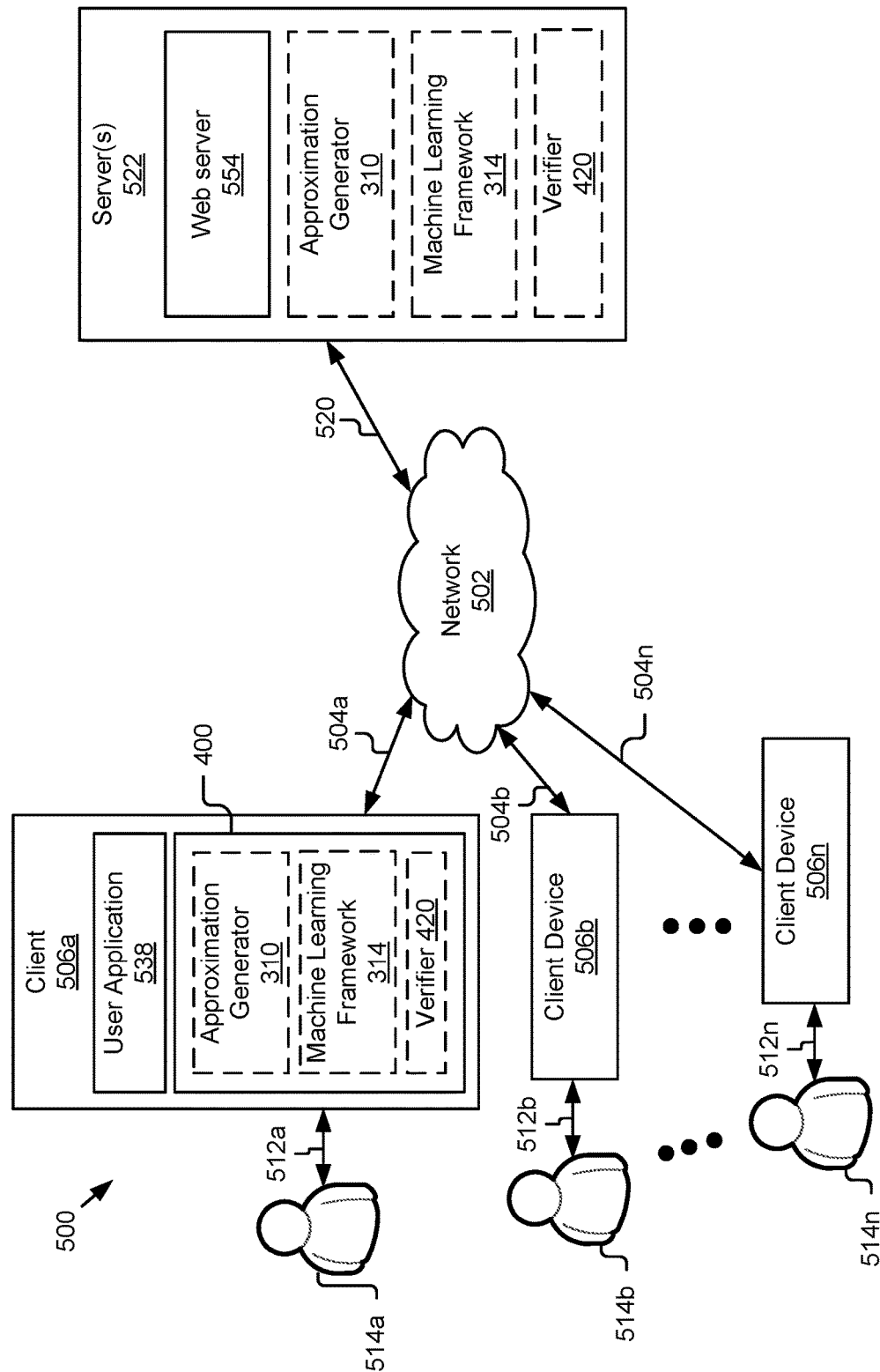
FIG. 5 is a block diagram of an example computing system.

FIG. 5 is a block diagram of an example computing system 500 that may include a client device 506a . . . 506n (also referred to herein individually and/or collectively as 506) and server(s) 522, which are electronically communicatively coupled via a network 502 for interaction with one another, although other system configurations are possible including other devices, systems, and networks. For example, the system 500 could include any number of client devices 506, third-party servers, servers 522, and/or other systems and devices.

The client devices 506a . . . 506n, and their components, may be coupled to the network 502 via signal lines 512a . . . 512n. The server(s) 522 and their components may be coupled to the network 502 via signal line 520. The users 514a . . . 514n may access one or more of the devices of the system 500. For example, as depicted, a user 514a may access and/or interact with the client device 506a as illustrated by line 512a, a user 514b may access and/or interact with the client device 506b as illustrated by line 512b, and a user 514n may access and/or interact with the client device 506n as illustrated by line 512n.

The network 502 may include any number of networks and/or network types. For example, the network 502 may include, but is not limited to, one or more local area networks (LANs), wide area networks (WANs) (e.g., the Internet), virtual private networks (VPNs), wireless wide area network (WWANs), Long Term-Evolution (LTE) networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols.

A client device 506 includes one or more computing devices having data processing and communication capabilities. The client device 506 may couple to and communicate with other client devices 506 and the other entities of the system 500 via the network 502 using a wireless and/or wired connection. Examples of client devices 506 may include, but are not limited to, mobile phones, tablets, laptops, desktops, netbooks, server appliances, servers, virtual machines, TVs, etc. The system 500 may include any number of client devices 506, including client devices of the same or different type.

The client device(s) 506 and/or the server(s) 522 may include instances of the application 400 or component(s) thereof, such as approximation generator 310, machine learning framework 314, and/or verifier 420. In some configurations, the application 400 may be distributed. For instance, the approximation generator 310, the machine learning framework 314, the verifier 420, and/or other components of the application 400 may be distributed over the network 502 on disparate devices in disparate locations or may reside in the same locations.

As a further example, the machine learning framework 314 may be accessed via application programming interfaces exposed by a server hosting the framework 314. For instance, the approximation generator 310 may be executed on first computing device(s) (e.g., a server 522 or a client 506), and may include software methods that instantiate a remote instance the machine learning framework 314 executed on other (second) computing device(s), call methods of the machine learning framework 314 remotely to instruct the machine learning framework 314 to process the data input into the machine learning framework 314 (e.g., parsed template(s), which may include an array of to-be-determined parameters, an array of inputs, and/or an array of corresponding functions, etc.).

In some embodiments, the application 400 may be executed on local computing device(s) 104, and the user may interact and execute functions of the application 400 using the user application 538. The user application 538 may provide interfaces and other aspects that allow the user to utilize the features of the approximation generator 310 and/or the verifier 420. During processing, the approximation generator 310 may pass data to the machine learning framework 314 operating on the same computing device by instantiating local software methods. Numerous other variations are also possible and contemplated.

The client devices 506 may store and/or operate other software such as a user application 538, an operating system, other applications, etc., that may be configured to interact with components of the application 400, other system 500 components via the network 502, etc.

The server(s) 522 have data processing, storing, and communication capabilities, as discussed elsewhere herein. The server(s) 522 may include one or more computing devices, one or more non-transitory memory devices, one or more datastores, one or more input and/or output devices, a communications bus coupling the server components, etc. For example, the server(s) 522 may include one or more hardware servers, server arrays, storage devices and/or systems, etc. In some embodiments, the server(s) 522 may include one or more virtual servers, which operate in a host server environment.

The web server 554 includes computer logic executable one or more computing devices to process content requests. The web server 554 may include an HTTP server, a REST (representational state transfer) service, or other suitable server type. The web server 554 may receive content requests (e.g., HTTP requests, requests using other protocols, etc.) from client devices 506 or other server(s) 522, cooperate with other the components of the application 400 (e.g., 410, 314, and/or 420) to determine the content, retrieve and incorporate data from a data repository (not shown), format the content, and provide the content to the requesting device(s). In some instances, the web server 554 may format the content using a web language and provide the content to a corresponding user application 138 for processing and/or rendering to the user for display. The web server 554 may be coupled to a data repository to store retrieve, and/or manipulate data stored therein and may be coupled to the application 400 and/or components thereof to facilitate operation thereof. For example, the web server 554 may allow a user on a client device 506 to communicate with the machine learning framework 314, approximation generator 310, other components of the application 400, etc.

Figure 6:
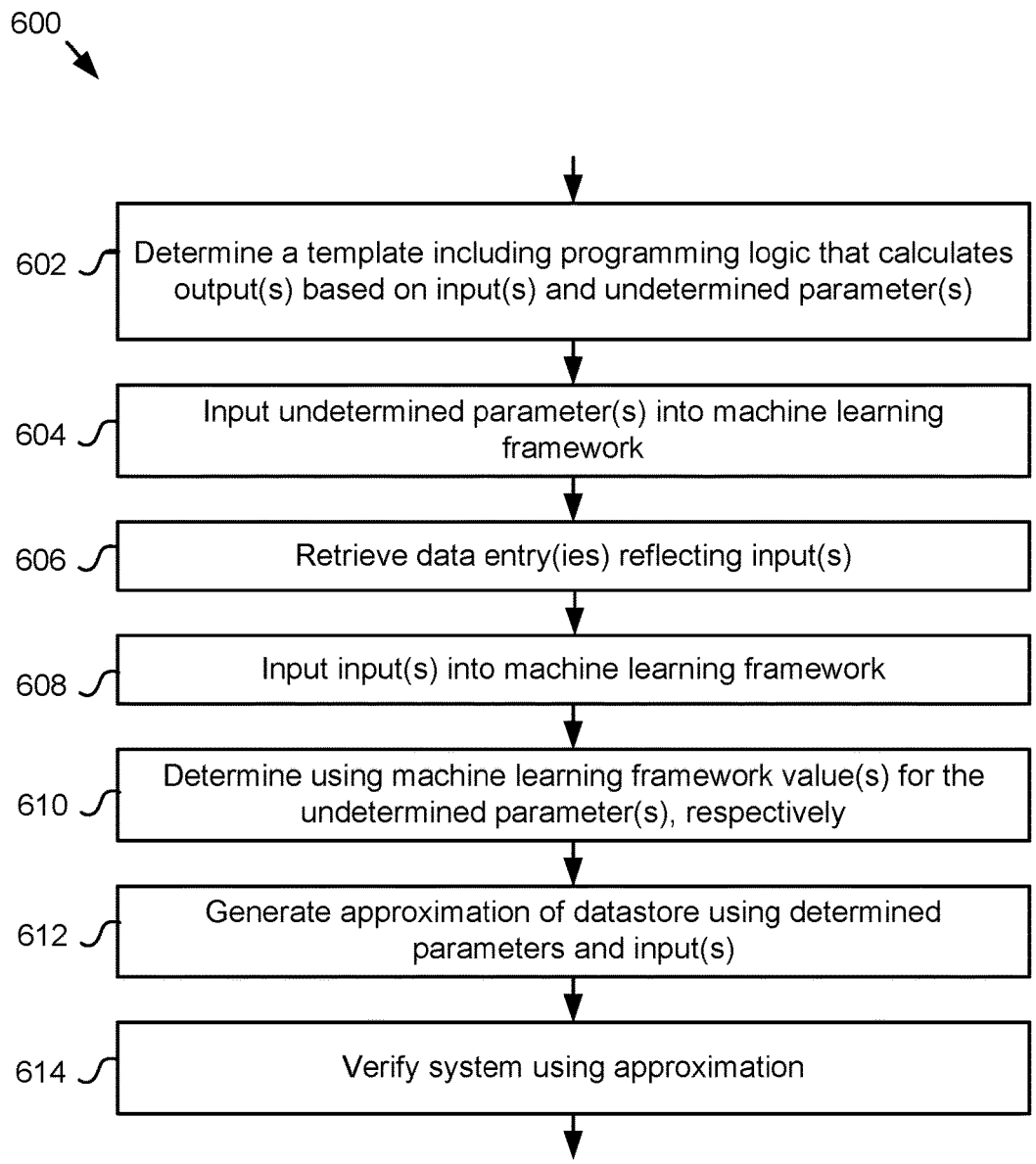
FIG. 6 is a flowchart of an example method for generating an approximation.

FIG. 6 is a flowchart of an example method 600 for generating an approximation 414. In block 602, the template parser 408 determines template(s), each template including programming logic that, when executed, calculates output(s) based on input(s) and parameter(s). The parameter(s) are initially undetermined parameter(s). In block 604, the approximation generator 310 inputs the undetermined parameter(s) into the machine learning framework 314.

In block 606, the data parser 406 retrieves, from the datastore 300 storing a multiplicity of indexed data entries. The data entry(ies) may reflect input(s) for the programming logic. In block 608, the approximation generator 310 inputs the input(s) into the machine learning framework 314.

In block 610, the machine learning framework 314 determines value(s) for the undetermined parameter(s), respectively. The value(s) are value(s) for the undetermined parameter(s), respectively, thus making the undetermined parameter(s) determined parameter(s). In some cases, the undetermined parameter(s) include a plurality of undetermined parameters and the values determined by the machine learning framework 314 are the values of those parameters, which are now determined. The programming logic may include a plurality of conditional statements, each of which may include a corresponding undetermined parameter for which a value has now been learned by the machine learning framework.

In block 612, the approximation generator 310 and/or the machine learning framework 314 generate an approximation of the datastore using the one or more determined parameters, the template(s), and the one or more inputs. In some cases, generating the approximation of the datastore includes determining a smoothed function and corresponding upper and a lower bounds for the multiplicity of indexed data entries.

In some embodiments, a plurality of data entries are retrieved in block 606 reflecting a plurality of cases, and generating the approximation of the datastore in block 612 includes summing the cases. In some instances, the plurality of cases may be mutually exclusive and the summing the cases includes calculating a sum of sigmoids. In some further instances, the plurality of cases may be concordant and approximating the program includes adding an additional product to disable to disable previous cases.

In block 614, the verifier 420 verifies a system, such as but not limited to control software that includes or relies upon the datastore 300, using the approximation.

FIGS. 7A and 7B are diagrams showing example approximations. As shown, the template programming logic includes an if-statement 700 including a piecewise function g(a,x), which is disjointed (e.g., not smooth) and/or concave (e.g., not convex).

Figure 8A:
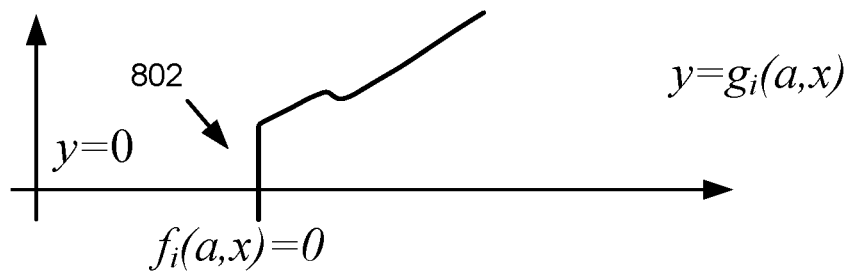
FIG. 8A is a disjointed graph reflecting a shifted step function from an if-statement.
Figure 8B:
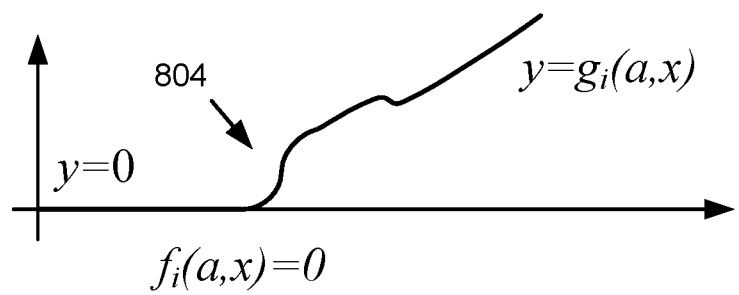
FIG. 8B is a smoothed graph reflecting an approximation of a step function from an if-statement.

The approximation generator 310 may represent the function of the if-statement 700 as a sum of sigmoids, which advantageously smooths out the disjoined nature of the function to provide smooth switching. For example, FIG. 8A is a disjointed graph 802 reflecting shifted step function from the if-statement 700, and FIG. 8B is a smoothed graph 804 reflecting an approximation of the step function from the if-statement 700 (e.g., using the sum of sigmoids).

In some embodiments in which cases are mutually exclusive, the overall conditional statement may be represented as a sum of sigmoids 702. This approach differs from the processing performed by a conventional neural network layer because functions from the programming logic are multiplied by the sigmoids as shown. In some embodiments in which cases are concordant, the overall conditional statement may be represented as a sum of sigmoids with prior cases disabled 706.

The approximations described herein can advantageously be optimized to be smooth and convex, which the approaches in the Background are either unable to provide or unable to provide without significant manual intervention and computationally expensive and/or unachievable data processing (under real world conditions).

By way of further example, the approximation generator 310 may abstract/approximate a datastore(s) 300 by functional intervals. A functional interval may be a function that for each argument $x \in \mathbb{R}^n$ returns a (closed) interval over $R, A(x) = [a(x), b(x)]$. The functional interval $A(x)$ may approximate a lookup table $L(x)$ over a set $S \subseteq \mathbb{R}^n$ if for every $x \in S, L(x) \in A(x)$. The approximation generator 310 may use a learning-based procedure to automatically compute a functional interval for each datastore 300 in the model by: fixing a parametric template for a function that approximates the datastore 300, learning parameter values that allow the function to approximate the lookup table data, and using bisection search to search for the smallest offset that can be added and subtracted from the approximation to yield upper and lower bounds for the lookup table function.

More particularly, the approximation generator 310 may learn an approximation of the lookup table data by letting f(a,x) be a function parametrized by $a \in \mathbb{R}^p$, with the same domain and range as the lookup table function L, and solving a regression problem to find the value of the parameter vector a that minimizes the mean-squared error over the breakpoints of the lookup table as follows:

$$\underset{a}{\text{minimize}} \sum_{i=1}^{k} (y^{(k)} - f(a, x^{(k)}))^2$$

Next, the approximation generator 310 may the approximation f to learn a functional interval by setting the offset to some initial value, e.g., $\epsilon = 1$. The approximation generator 310 and/or verifier 420 may then use an SMT solver to check whether the lower and upper offset functions $f(x) - \epsilon$ and $f(x) + \epsilon$ are lower and upper bounds and for the lookup table function over all values in the range of interest $S \subseteq \mathbb{R}^n$.

If the validity check fails (e.g., the 310 and/or 420 is able to find an $x \in S$ such that the datastore 300 produces a value outside of the upper and lower bounds), the approximation generator 310 and/or verifier 420 may try again with a larger value of $\epsilon$. If it succeeds, with this value as the upper cap (valid $\epsilon$) and 0 (invalid $\epsilon$) as the lower cap, the approximation generator 310 may do a bisection search to find the smallest value of $\epsilon$ (within some tolerance) such that the offset functions abstract the lookup table. This may yield a functional interval, $$A(x) = [f(x) - \epsilon, f(x) + \epsilon],$$

such that for all $x \in S, L(x) \in A(x)$. A bisection search may be used to determine the optimal $\epsilon$ approximately. FIG. 9 depicts an example datastore 300, which is linearly interpolated with n inputs and m breakpoints. In some embodiments, using the datastore 300, the application 400 may compute two functions $\bar{y}(x)$ and $\underline{y}(x)$ such that:
1. for each $x^{(j)} = (x_1^{(j)}, \ldots, x_n^{(j)}), \bar{y}(x^{(j)}) \geq y^{(j)}$ and the upper bound error $\bar{e} = \bar{y}(x^{(j)}) - y^{(j)}$,
2. for each $x^j = (x_1^{(j)}, \ldots, x_n^{(j)}), \underline{y}(x^j) \leq y^{(j)}$ and the lower bound error $\underline{e} = \underline{y}(x^{(j)}) - y^{(j)}$ is small, and
3. $\bar{y}(x)$ and $\underline{y}(x)$ have a simple arithmetic structure, e.g. low-order polynomials or rational functions, or contain few transcendental terms.

As discussed in the Background, the above requirements may conflict using existing approaches. $\bar{y}(x)$ and $\underline{y}(x)$ can be computed such that the bound errors $\bar{e}$ and $\underline{e}$ are within an acceptable range, for example, by using a regression technique on a function template. Attaining low bound errors, however, would require high-order polynomials or other complex nonlinear functions, which bear the significant disadvantages discussed in the Background. On the other hand, overly simple bounding functions may have a large bounding error.

The application 400 can optimize for these requirements by defining a database approximation structure $A(x)$ as the interval between the two functions, $A(x) = [\underline{y}(x), \bar{y}(x)]$. These definitions indicate that for every $x_i^{(j)}, y^{(j)} \in A(x_i^{(j)})$.

The program template may include the below programming logic having the following function templates $f_i(x,a)$ and $g_i(x,a)$, in which the objective is to instantiate values for the parameter vector a. An example program template may include the following programming logic:

```
if (g₁(x, a) > 0)
    y = f₁(x, a);
elseif (g₂(x, a) > 0)
    y = f₂(x, a);
    .
    .
elseif (gₖ(x, a) > 0)
    y = fₖ(x, a)
```

In some embodiments, program templates are optimized to have a structural parameter with a range of values are used, such as $k \in \{k_1, k_2, \ldots\} \subset \mathbb{N}$. In some cases, when a datastore 300 (e.g., LUT) can be approximated by a single smooth function, k=1.

For each value of k, the approximation generator 310 approximates the programming logic using the following smooth function with sigmoids:

$$\tilde{y}(x, a) = \sum_{i=1}^{k} f_i(x, a) \left( \prod_{k=1}^{i-1} \text{sigmoid}(-g_k(x, a)) \right) \text{sigmoid}(g_i(x, a)).$$

Further, the approximation generator 310 uses machine learning provided by the machine learning framework 314 to instantiate values for a parameter vector a, â. The machine learning framework 314 may be tuned to minimize the error when determining the values for the parameter vector. For instance, the machine learning framework 314 may determine a value of a that minimizes a loss function $\mathcal{L}: y \times y \to \mathbb{R}$ over the datastore entries as indicated in the following equation:

$$\min_{a \in \mathbb{R}^z} \sum_{j=1}^{m} \mathcal{L}(y(x^{(j)}), y^{(j)}).$$

Once the parameter vector is determined, the approximation generator 310 replaces a=â in the original program template, yielding an approximation of the datastore 300.

During verification, the verifier 420 may select, from among the values of k of populated program templates, a program template whose corresponding programming logic has a particular error value or range (e.g., smallest) over the linear interpolation of the data in the datastore.

In some cases, the n-dimensional LUT 900 with m-breakpoints may reflect a function $\lambda: \mathbb{R}^n \to \mathbb{R}$, such that for each breakpoint $(x^{(k)}, y^k)$, $(k \in \{1, \ldots, m\})$ that appears in the table, $\lambda(x^k) = y^k$, and for every point $x \in \mathbb{R}^n$ that does not appear in the table, if each component $x_i$ may be contained in the range of the LUT, e.g., $$\min_k(x_i^k) \le x_i \le \max_i(x_i^k)$$

then $\lambda(x)$ is given by some interpolation function (e.g., interp).

Otherwise, $\lambda(x)$ may be given by some extrapolation scheme (e.g., extrap).

For n dimensions, the following notation may be used notation $$\text{multiLinInterp}_n((x^{(1)}, y^{(1)}), (x^{(2)}, y^{(2)}), x)$$

to mean the n-dimensional interpolation function between points $(x^{(1)}, y^{(1)})$ and $(x^{(2)}, y^{(2)})$ are evaluated at x. The range of interest may be extrapolated or limited to the range of the LUT.

Some embodiments may encode a system and its specification into first-order logic. An n-dimensional, m-breakpoint LUT may be encoded as a first-order logical formula. For example, for a two-dimensional lookup table with m breakpoints, the k-th breakpoint can be encoded by the following logical formula when k=1, ..., m−1:

$$b_k = x_1^{(k)} \le x_1 \le x_1^{(k+1)} \land x_2^{(k)} \le x_2 \ge x_2^{(k+1)} \to$$
$$y = \text{multiLinInterp}_2((x^{(k)}, y^{(k)}), (x^{(k+1)}, y^{(k+1)}), x).$$

The vector x is the input of the lookup table, and $x_1$ and $x_2$ are its components. The function multiLinInterp$_2$ is a bilinear interpolation.

The overall lookup table can be expressed by the conjunction of the logical formulas for the breakpoints as follows:

$$L \equiv \bigwedge_{k=1}^{m} b_k$$

Figure 10:
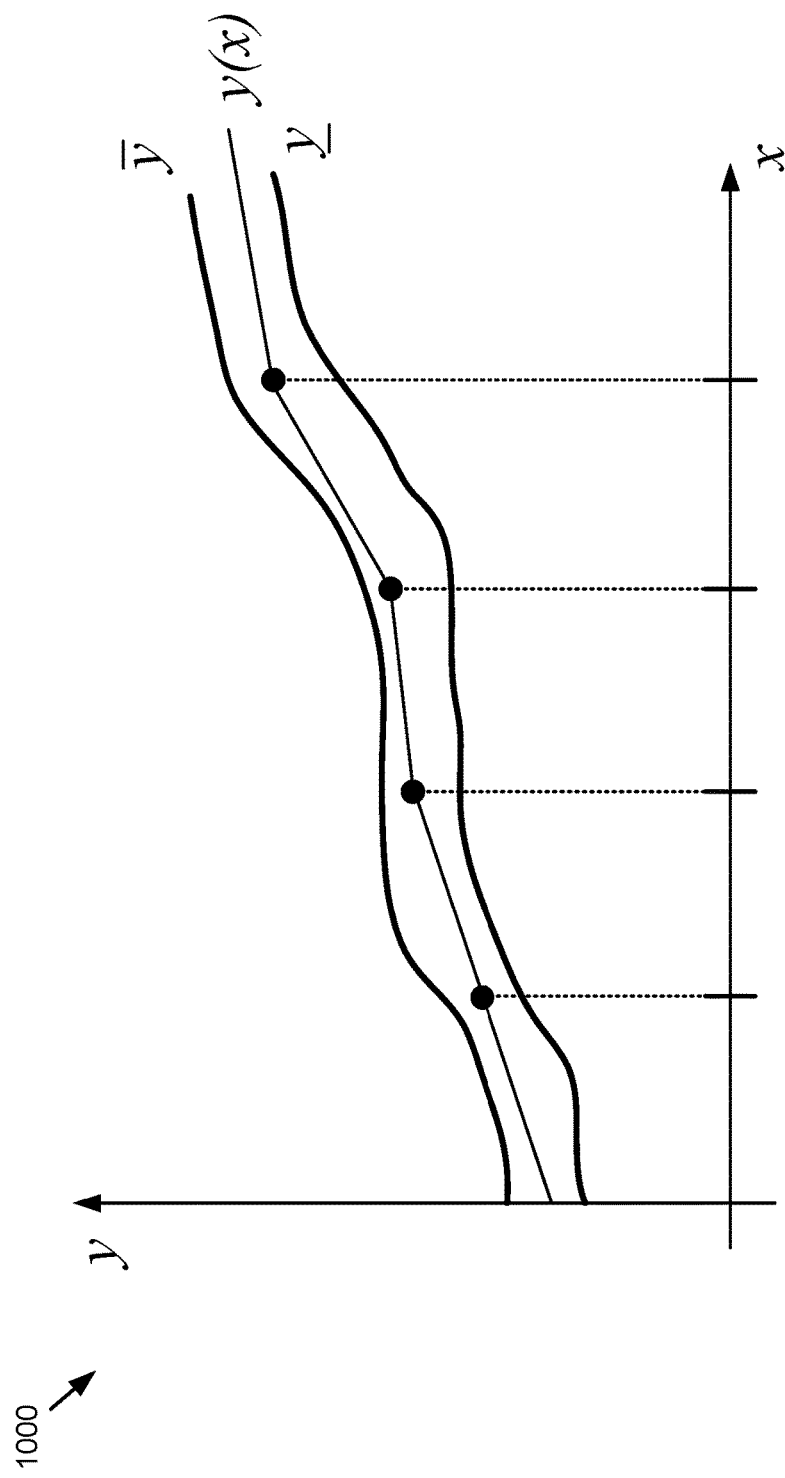
FIG. 10 is a graph showing an example approximation.

FIG. 10 is a graph representing an example approximation 1000 having upper and lower bounds, and following the following assumptions: $\forall x$, assume $(x) \Rightarrow \underline{y}(x) \le y(x) \le \overline{y}(x)$. The approximation 1000 can advantageously fit sharp corners while providing the advantage of not having to process every case in the datastore during verification.

During verification, the verifier 420 can advantageously account for falsification of the system component, such as a software program.

For instance, the approximation generator 310 may compute approximations of datastore(s), such as LUT(s), of a software system, using but not limited to the novel techniques discussed herein. For instance, the approximations used with reference to FIGS. 11-16 may alternatively or additionally use other suitable system abstraction methods, such as those discussed in the Background.

The verifier 420 may verify a software program using the approximation(s) that correspond to that software program. If, during verification, candidate error condition(s) are detected by the verifier 420, the verifier 420 may utilize the method(s) discussed with reference to FIGS. 13-15 confirm whether the candidate error condition(s) are actually errors or not.

For instance, if the verification performed by the verifier 420 identifies a candidate error, the verifier 420 can determine whether the candidate error/violation is an actual error or a false positive. Errors may exist within the approximations because they are less granular and often larger in scope than the actual data entries in the datastore. In some embodiments, upon identifying an error, because data points within the approximation may or may not actually be in the datastore approximated by the approximation.

The technology can automatically search and verify the existence of the error condition, and revalidate the software program using revised approximation(s) should the error condition be real.

Figure 11:
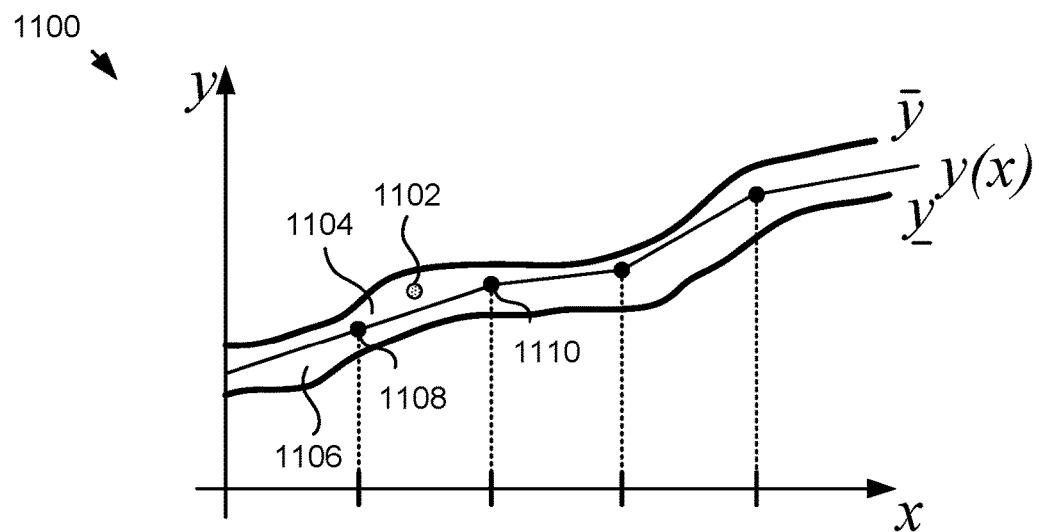
FIG. 11 is a graph showing a data point within a bounding region of the approximation.

FIG. 11 is a graph 1100, representing an example approximation, showing a data point 1102 within a bounding region of the approximation. As shown, the approximation includes a lower bounding region 1104 and an upper bounding region 1106. The lower bounding region and the upper bounding region meet along a centerline comprising data points (e.g., 1108 and 1110) having values retrieved from data entries of the datastore and used as inputs to generate the centerline.

The verification procedure performed by the verifier 520 may find a violation, such as data point 1102, between the upper and lower bounds that is not in the real model. As shown, the data point 1102 is between the function bounds—lying within the upper bounding region 1104. While a single point is depicted in this example, it should be understood that other points that lie elsewhere within the upper and lower bounding regions 1104 and 1106 could also be determined as candidate errors that require further verification.

Figure 12:
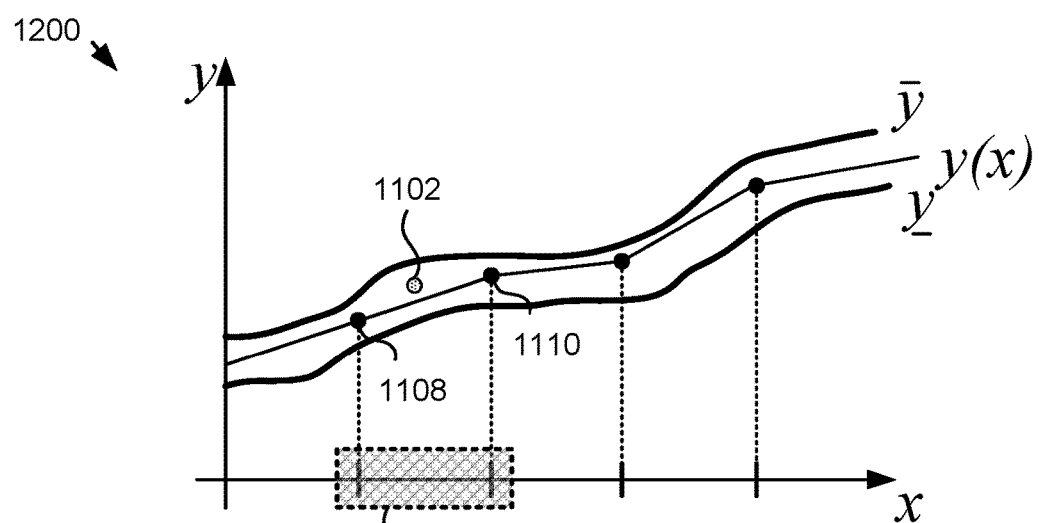
FIG. 12 is a graph showing a data range in which the data point resides.

If the verifier 420 determines the data point 1102 to be a candidate error, it proceeds to check whether the candidate error is actually an error. The verifier begins the check by determining a certain data range of the approximation (e.g., of input values, x values, etc.). FIG. 12 is a graph 1200 showing a data range 1202 in which the data point 1102 resides. This range is used by the verifier 420 to search for candidate error in the datastore.

In some embodiments, the bounds of the range are determined based on proximity of the input values to the data point in question. For example, input values 1108 and 1110 may reflect or be used to determine the bounds of the range 1202. In some case, a predetermined buffer value for end of the range to limit the range from being overly broad or narrow, thus reducing potential error. In another example, the range may bound the data point or points in question as tightly as possible (within an increment or fraction of an increment, within a certain number of decimal places, match exactly the input values, etc.). Other variations are also possible and contemplated.

Multiple candidate data points may be determined as suspect and verified by the verifier 420 in the same pass. This may potentially cause a plurality of ranges to be determined the verifier 420, some of which may overlap, in which case the searching of the datastore may be optimized (e.g., by combining the ranges), searching using arrays of candidates for a given range, etc.

The verifier 520 can then search data from the datastore over these range(s) to determine whether the data point(s), such as the data points 1102, are actual violation(s), as discussed elsewhere herein.

In some embodiments, when the falsification procedure fails to find a true counterexample, the verifier 420 may 1) refine the approximation(s) and repeat the verification attempt by increasing arithmetic complexity of the template(s), 2) increase the number of cases in a piecewise template, and/or 3) fit the error of an approximation. In some cases, these techniques may be implemented in parallel to yield the approximation with lowest error. By way of further example, increasing arithmetic complexity may include moving from linear templates to quadratic templates, higher-order polynomials, or possibly transcendental functions if one is using an SMT solver that supports such functions; and increasing the number of cases in a piecewise template may include moving from an equational template with a single case to a template with two cases, or from two to three, etc.

As a further example, assuming the abstraction $A_i(x)=\{f_i(x)-\varepsilon_i, f_i(x)+\varepsilon_i\}$ was learned for the lookup table function $L_i(x)$, the error lookup table function may be defined $E_i(x)$ as $E_i(x)=f_i(x)-L_i(x)$;

$y_i$ may be defined as be the output of the LUT $L_i$;

the logical constraints that define the system may be augmented as follows: $\Sigma(x) \equiv \Sigma(x) / \wedge_i y_i = f_i(x)$; and the abstraction $A_{E_i}(x)$ for $E_i(x)$ may be learned and the verifier 420 may check the satisfiability of:

$$\hat{\Sigma} \wedge \left( \bigwedge_i A_{E_i}(x) \right) \neg S(x).$$

The error fitting procedure can be applied recursively to the error of the error table with its approximation, and in general, the above techniques (1-3) can be applied individually, in parallel, and/or sequentially in any order. In some cases, the application 400 may performs all three at each refinement attempt and may utilize the one that yields the smallest error.

Figure 13:
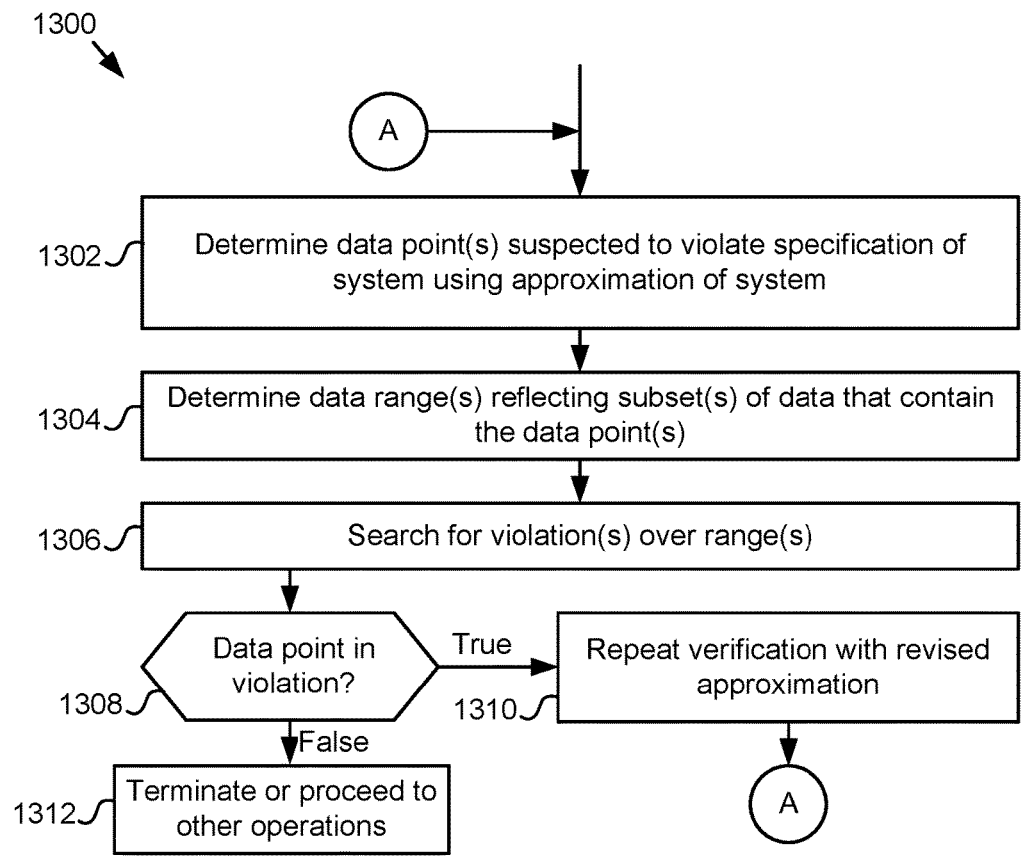
FIG. 13 is a flowchart of an example method for software program verification using approximation(s).

FIG. 13 is a flowchart of an example method 1300 for software program verification using approximation(s). In block 1302, the verifier 420 determines data point(s), suspected to violate the specification of the software program being verified, using approximation(s) of datastore(s) of a software program. In some embodiments, data embodying specifications may be stored in a data repository, such as the specification database, and the parameters of the specifications may be retrieved and compared to the data points in determining the data points as candidate errors.

A software program, such as control software of an electromechanical system, may have a plurality of datastores that model the behavior of the electromechanical system, the verifier 420 may verify inputs for any number of datastore approximations.

In block 1304, the verifier 420 determines data range(s) reflecting subset(s) of data from the approximation(s) that contain the data point(s), and in block 1306, the verifier 420 searches for violation(s) over the range(s).

In some embodiments, the verifier 420 searches for violation(s) over the range(s) by extracting data entries from the datastore that lie within each of the one or more data ranges, and determining whether the one or more data points match one of the data entries lying within one of the data ranges. In some cases, the verifier 420 confirms that a candidate error/data point is an error because the data point matches a data entry from among the extracted data entries. In some cases, the verifier 420 confirms that a data point is not an error because the data point does not match a data entry from among the extracted data entries.

The searching in block 1306 is advantageous as it helps to target the search for the error and can substantially reduce the processing time needed to check their, making the approach amendable to scalable, real world implementation.

Next, the verifier 420 determines whether the data point(s) are in violation of the specification based on the searching. In particular, in block 1308, the verifier 420 determines, for each data point, whether the data point is in violation. If the determination is true, verifier 420 repeats verification of the software program using a revised approximation. Additionally or alternatively, the verifier 420 may notify a stakeholder, such as a user, of the error/violation via corresponding interface presented by a user application 538. If the data point is not in violation, the method 1300 may iterate to process other suspected data points, may terminate if complete, and/or proceed to other operations.

In some embodiments, the verifier 420 may use a satisfiability modulo theories (SMT) solver to verify if a given candidate represents a real error in a given range (or interval of inputs), although other variations are also possible and contemplated.

For instance, assuming $\Gamma(x)$ is a set of logical formulas with a vector of free variables x, and x takes values in $\mathbb{R}^n$, SMT may find a point $r \in \mathbb{R}^n$ such that the logical formula $\Gamma(r)$ is true, or prove that none exists. In this case, r satisfies $\Gamma$.

An example system may be translated to a set of logical constraints $\Sigma(x)$, where x is the vector of all variables that occur in the system, including inputs, outputs, and intermediate assignment variables. In this example, the LUT(s) of the system may be handled separately. Each LUT may be indexed by i and may be encoded as a first-order logic formula $L_i(x)$. Similarly, the specification may be given as a first-order formula $S(x)$. The system 500 can determine whether value of the variables x exists that:
- satisfies the model constraints $\Sigma(x)$—values that are related to each other according to the structure of the model;
- satisfies each $L_i$—values that are related to each other in a way that satisfies the mapping produced by the lookup tables; and
- does not satisfy the specification $S(x)$—is an erroneous condition.

To check for the existence of this kind of erroneous condition, the verifier 420 may use an SMT solver to check the satisfiability of the following logical formula, assuming the number of lookup tables in the model is N:

$$\left(\bigwedge_{k=1}^{m} L_k\right) \wedge \Sigma(x) \wedge \neg S(x).$$

The system 500 can advantageously generate an approximation $A_i$ for each $L_i$ by using the lookup table data as training data to learn parameters in an program template. As a result, the logical formula will can be simplified and a falsification heuristic that can be used to find true counter-examples when the verification does not succeed.

Figure 14:
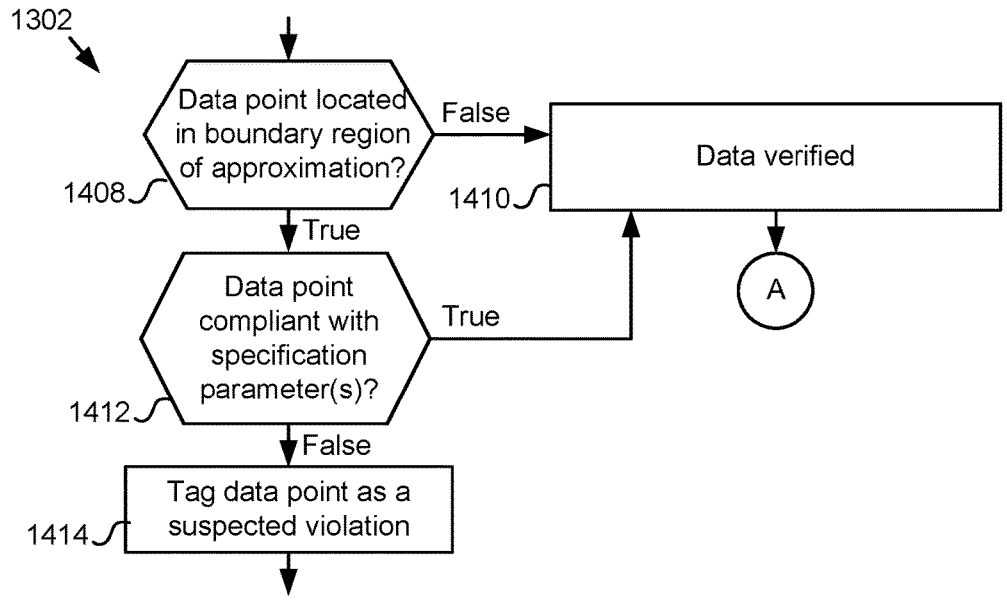
FIG. 14 is a flowchart of an example method for determining data point(s) suspected to violate a system specification.

FIG. 14 is a flowchart of an example method 1302 for determining data point(s) suspected to violate a specification. In some embodiments, the method 1302 may reflect operations that may be performed by the verifier 420 in block 1302 of the method 1300. In block 1408, for each data point, the verifier 420 determines whether the data point is located in a bounding region of approximation. If the determination is false, and the data point is either located outside the bounding region, matches an input, etc., then the verifier 420 determines the data point to be verified in block 1410. If the determination in block 1408 is true, the verifier 420 determines in block 1412 whether the data point is compliant with one or more specification parameters of the software program. In some embodiments, specification parameters may be retrieved by the verifier 420 from non-transitory data storage, such as a specification database as discussed elsewhere herein. If the determination in block 1412 is true, then the verifier 420 determines the data point to be verified in block 1410. If the determination in block 1412 is false, then the verifier 1420 tags the data point as a suspected violation.

Figure 15:
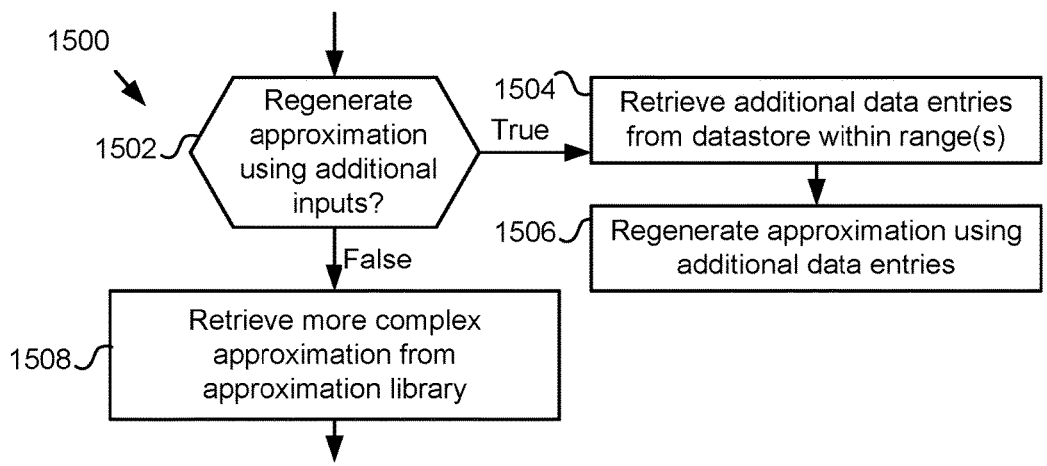
FIG. 15 is a flowchart of an example method for determining a revised approximation.

FIG. 15 is a flowchart of an example method 1500 for determining revised approximation(s). In block 1502, verifier 420 determines whether an approximation should be regenerated using additional inputs. If the determination is false, the verifier 420 retrieves a more complex approximation from the approximation library and then repeats the verification process, such as the operations 1302-1308 of method 1300. If the determination is true, the verifier 1420 retrieves additional data entrie(s) (e.g., as inputs) from the datastore(s) within the range(s) in block 1504, and regenerates and approximation using the additional data entrie(s). For example, the verifier 1420 may signal the approximation generator 1310 to regenerate an approximation using the additional inputs in the manner discussed elsewhere herein. Other approximation variations are also possible and contemplated. In some embodiments, the method 1500 is performed in conjunction with the operations in block 1310 of the method 1300, where the regenerated approximation reflects a revised approximation.

Figure 16:
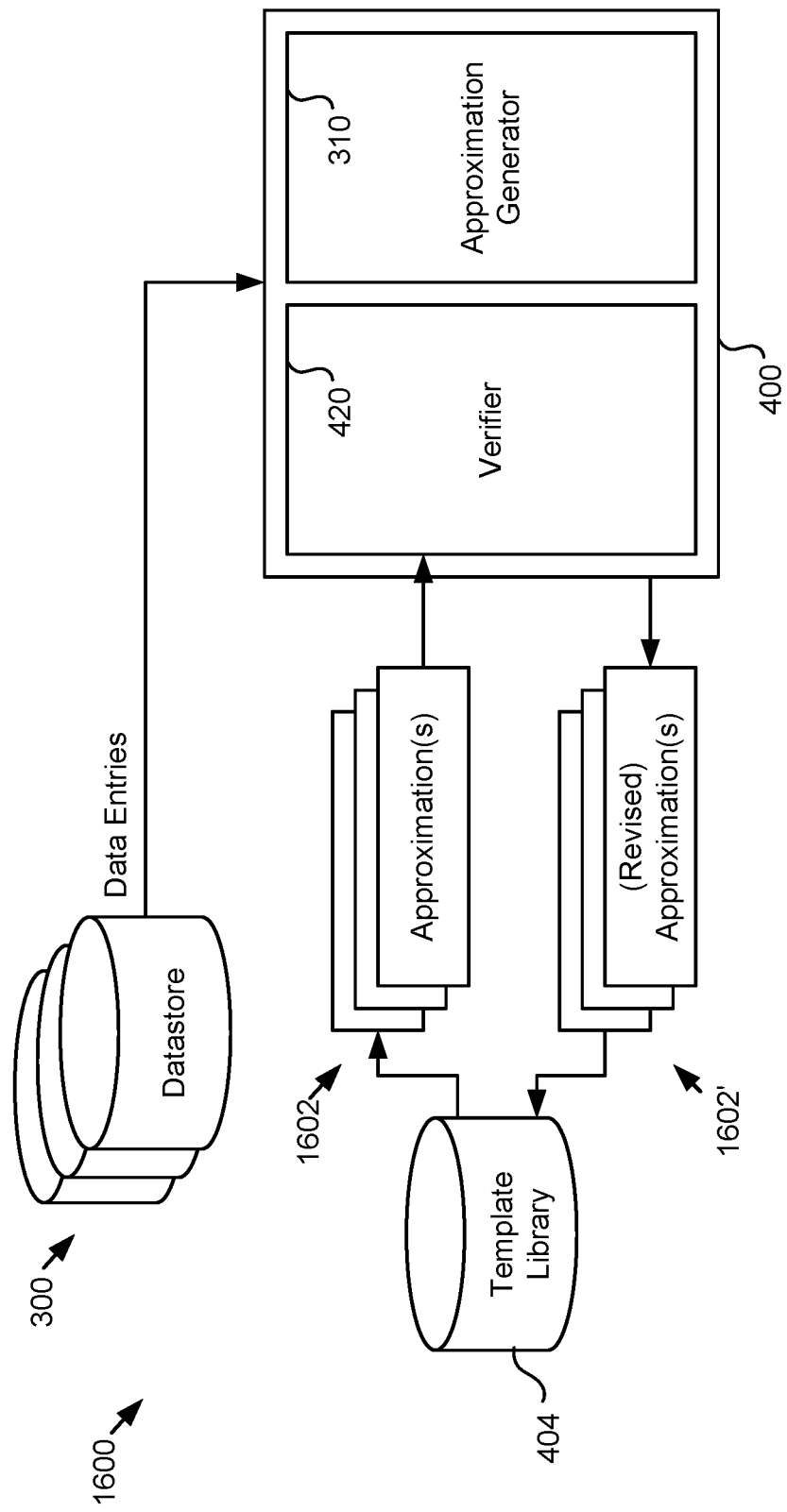
FIG. 16 is a block diagram of an example system for software program verification using approximation(s).

FIG. 16 is a block diagram of an example system 1600 for software program verification using approximation(s). As shown, the system 1600 may include a plurality of datastores 300 that are associated with a plurality of different software programs. The software programs may be configured to control physical systems, which are modeled by the data stored in the datastores. As discussed elsewhere herein, example software systems may include native or distributed applications, embedded applications, firmware, etc.

The application 400 may retrieve data entries from the data stores, as discussed elsewhere herein. The approximation generator 310 may use the data entries as inputs for generating approximations 1602', which may include revised approximations as discussed herein. The approximations 1602' and be stored by the application 400 in the template library 404. The verifier 420 may retrieve approximations 1602 from the template library 404. The retrieved approximations 1602 may be initial approximations or revised approximations. In some embodiments, a revised approximation is an approximation regenerated using additional inputs or an alternative approximation that is more complex than previous approximation used to verify a software program.

As a further practical, non-limiting example, the system being modeled may include an adaptive cruise controller along with an online monitor. When enabled, adaptive cruise control regulates the speed of the car so that a target speed is maintained, unless another car is detected at some distance in front, in which case the system tries to maintain a safe distance from the lead car. The controller takes as input the current speed of the car, the distance to the lead car, and the relative speed between the two cars.

The system model may include a cascade of three lookup tables. The inputs to the controller may include s, the speed of the controlled car, $\Delta_x$, the distance to the leading car, and $\Delta_v$ the relative speed of the two cars. The first lookup table may use the current velocity s of the controlled car to determine a target set distance ($\Delta_x^{(target)}$) from the leading car. If the controlled car is moving fast, its braking distance will be larger, which requires that the controller choose a longer following distance. $\Delta_x^{(error)}$ is the difference between the target following distance and the chosen following distance, and the second lookup table uses $\Delta_x^{(target)}$ together with the relative velocity $\Delta_v^{(target)}$ to choose an acceleration.

The third lookup table behaves as an online monitor, which, in practice, may be populated by recording observations of a physical component (e.g., populated with the computed the future distance between the two cars after 0.1 seconds, given the current distance, relative velocity, and chosen acceleration). In this example, the monitor assumes that the lead car will not change its velocity within the next 0.1 seconds. In this example, the first lookup table contains 21 breakpoints, the second contains 1155 breakpoints, and the third, monitor lookup table contains 385 of breakpoints. In total, the cascaded lookup tables produce 9,338,175 proof cases.

The model is translated to first order logic as follows in part:

$$0 \leq \Delta_x \leq 180$$

$$-50 \leq \Delta_v \leq 50$$

$$0 \leq s \leq 180$$

$$\Delta_x^{(target)} = \text{LUT}_1(s)$$

$$\Delta_x^{(error)} = \Delta_x - \Delta_x^{(target)}$$

$$a = \text{LUT}_2(\Delta_x^{(error)}, \Delta_v)$$

$$\Delta_x^{(next)} = \text{LUT}_3(\Delta_x, \Delta_v, \Delta_v^{(next)})$$

The constraints on $\Delta_x$, $\Delta_v$, and s are assumptions on the bounds of these inputs (e.g., commercial adaptive cruise control systems typically cannot be used if the speed of the controlled car is too slow). When executed, a counterexample was found in 3 minutes and 30 seconds (e.g., on a system with 8 cores and 132 GB of RAM), as follows.

$$s \mapsto 31.0$$

$$a \mapsto -2.0$$

$$\Delta_v \mapsto -4.0$$

$$\Delta_x \mapsto 0.03125$$

$$\Delta_x^{(error)} \mapsto -30.97$$

$$\Delta_x^{(target)} \mapsto -31.0$$

$$\Delta_x^{(next)} \mapsto 0.00865$$

The meaning of this counterexample is that the cars start at a distance $\Delta_x$ of about 3 cm, with a relative velocity of −4 m/s, i.e. the controlled car is moving 4 m/s faster than the lead car. The controller tries to brake by applying a negative acceleration of a=−2 m/s², but the situation is already too dangerous and the cars have a minor crash, with the controlled car being 0.8 cm further than it should be.

The abstraction computed for the LUT$_1$ comprises a linear function, shifted above and below the lookup table data:

$$A_i = [1.27\, s + 0.43 + 29.69, 1.27\, s + 0.43 - 29.69]$$

The abstraction computed for LUT$_2$ is a piecewise linear function, and has the form $$A_2 = [f_2(x) + \epsilon_2, f_2(x) - \epsilon_2] \text{ where}$$

$$f_2 = \begin{cases} 0.024\Delta_x^{(error)} + 0.093\Delta_v - 0.508 & \text{if } g_2(x) \geq 0 \\ 0.020\Delta_x^{(error)} + 0.093\Delta_v - 0508 & \text{otherwise} \end{cases}$$

and $$g_2(x) = 0.321\Delta_x^{(error)} - 1.232\Delta_v - 1.$$

The abstraction computed for LUT$_3$ is also a piecewise linear function, $$A_3 = [f_3(x) + \epsilon_3, f_3(x) - \epsilon_3]$$

where $$f_3 = \begin{cases} f_3^{(1)} & \text{if } g_3(x) \geq 0. \\ f_3^{(2)} & \text{otherwise} \end{cases}$$

and $$f_3^{(1)} = 0.997\Delta_x + 0.006\Delta_v - 0.003\Delta_x^{(next)} + 0.409$$

$$f_3^{(2)} = 1.593\Delta_x - 0.006\Delta_v - 0.059\Delta_x^{(next)} + 1.143$$

$$g_3(x) = 0.795\Delta_x - 0.222\Delta_v - 0.476\Delta_x^{(next)} + 0.503.$$

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

It should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system 500 depicted in FIG. 5 provides an example of an applicable computing architecture, it should be understood that any suitable computing architecture, whether local, distributed, or both, may be utilized in the system 500.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussion, it is appreciated that throughout this disclosure, discussions utilizing terms including "processing," "computing," "calculating," "determining," "displaying," "inputting," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a non-transitory memory device(s) such as a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A computing device suitable for data processing, storing, and/or executing program code may include at least one processor coupled directly or indirectly to memory elements through a system bus. The non-transitory memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 502.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Various general-purpose systems may be adapted with programs in accordance with the teachings herein, or it may prove convenient to construct more specialized apparatus to perform the required method blocks. The required structure for a variety of these systems will appear from the description above. Any suitable programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

The components, frameworks, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method, comprising:
   determining, using one or more computer processors, one or more data points, suspected to violate a specification of a software program being verified, that lie within one or more bounding regions of an approximation of a datastore of the software program, the datastore of the software program storing one or more data entries generated by the software program, the approximation of the datastore approximating the one or more data entries generated by the software program in the datastore by the one or more bounding regions;
   determining, using the one or more computer processors, one or more data ranges reflecting one or more subsets of data from the approximation that contain the one or more data points;
   searching, using the one or more computer processors, first data entries stored in the datastore of the software program for the one or more data points suspected to violate the specification of the software program, the first data entries lying within the one or more data ranges; and
   determining, using the one or more computer processors, whether the one or more data points are in violation of the specification based on the searching.

2. The computer-implemented method of claim 1, wherein the datastore includes a lookup table associated with the software program.

3. The computer-implemented method of claim 2, wherein the software program is an automotive software program.

4. The computer-implemented method of claim 1, wherein the one or more data entries of the datastore model a physical system controlled by the software program.

5. The computer-implemented method of claim 1, wherein the one or more bounding regions of the approximation include a lower bounding region and an upper bounding region, the lower bounding region and the upper bounding region meet along a centerline comprising data points having values retrieved from the one or more data entries of the datastore, and each of the one or more data points, suspected to violate the specification, lie within one of the lower bounding region and the upper bounding region.

6. The computer-implemented method of claim 1, wherein determining whether the one or more data points are in violation of the specification based on the searching includes:
   extracting data entries from the datastore that lie within each of the one or more data ranges, and determining whether the one or more data points match one of the data entries lying within one of the data ranges.

7. The computer-implemented method of claim 6, wherein determining whether the one or more data points are in violation of the specification based on the searching includes:
confirming that a data point from the one or more data points is an error because the data point matches a data entry from among the extracted data entries.

8. The computer-implemented method of claim 6, wherein determining whether the one or more data points are in violation of the specification based on the searching includes:
confirming that a data point from the one or more data points is not an error because the data point does not match a data entry from among the extracted data entries.

9. The computer-implemented method of claim 1, wherein the datastore includes $10^{10}$ or more entries.

10. A computer system, comprising:
one or more computer processors; and
one or more computer memories storing instructions that, when executed by the one or more computer processors, perform operations comprising:
determining, using the one or more computer processors, one or more data points, suspected to violate a specification of a software program being verified, that lie within one or more bounding regions of an approximation of a datastore of the software program, the datastore of the software program storing one or more data entries generated by the software program, the approximation of the datastore approximating the one or more data entries generated by the software program in the datastore by the one or more bounding regions;
determining, using the one or more computer processors, one or more data ranges reflecting one or more subsets of data from the approximation that contain the one or more data points;
searching, using the one or more computer processors, first data entries stored in the datastore of the software program for the one or more data points suspected to violate the specification of the software program, the first data entries lying within the one or more data ranges; and
determining, using the one or more computer processors, whether the one or more data points are in violation of the specification based on the searching.

11. The computer system of claim 10, wherein the datastore includes a lookup table associated with the software program.

12. The computer system of claim 11, wherein the software program is an automotive software program.

13. The computer system of claim 10, wherein the one or more data entries of the datastore model a physical system controlled by the software program.

14. The computer system of claim 10, wherein the one or more bounding regions of the approximation include a lower bounding region and an upper bounding region, the lower bounding region and the upper bounding region meet along a centerline comprising data points having values retrieved from the one or more data entries of the datastore, and each of the one or more data points, suspected to violate the specification, lie within one of the lower bounding region and the upper bounding region.

15. The computer system of claim 10, wherein determining whether the one or more data points are in violation of the specification based on the searching includes:
extracting data entries from the datastore that lie within each of the one or more data ranges, and
determining whether the one or more data points match one of the data entries lying within one of the data ranges.

16. The computer system of claim 15, wherein determining whether the one or more data points are in violation of the specification based on the searching includes:
confirming that a data point from the one or more data points is an error because the data point matches a data entry from among the extracted data entries.

17. The computer system of claim 15, wherein determining whether the one or more data points are in violation of the specification based on the searching includes:
confirming that a data point from the one or more data points is not an error because the data point does not match a data entry from among the extracted data entries.

18. The computer system of claim 10, wherein the datastore includes $10^{10}$ or more entries.

19. A computer-implemented method, comprising:
determining, using one or more computer processors, one or more data points, suspected to violate a specification of a software program being verified, that lie within one or more bounding regions of an approximation of a lookup table (LUT) storing one or more data entries modeling a physical system controlled by the software program, the approximation of the LUT approximating the one or more data entries stored in the LUT by the one or more bounding regions;
determining, using the one or more computer processors, one or more data ranges reflecting one or more subsets of data from the approximation that contain the one or more data points;
searching, using the one or more computer processors, first data entries stored in the LUT of the software program for the one or more data points suspected to violate the specification of the software program, the first data entries lying within the one or more data ranges; and
determining, using the one or more computer processors, whether the one or more data points are in violation of the specification based on the searching.

\* \* \* \* \*